United States Patent
Coon

(10) Patent No.: US 12,324,521 B2
(45) Date of Patent: Jun. 10, 2025

(54) WHITEBOARD SUBSTRATE WITH MOUNTING ASSEMBLY

(71) Applicant: TeacherGeek, Inc., Holley, NY (US)

(72) Inventor: Darren Coon, Holley, NY (US)

(73) Assignee: TEACHERGEEK, INC., Holley, NY (US)

( * ) Notice: Subject to any disclaimer, the term of this patent is extended or adjusted under 35 U.S.C. 154(b) by 0 days.

(21) Appl. No.: 18/858,185

(22) PCT Filed: Apr. 20, 2022

(86) PCT No.: PCT/US2022/071821
§ 371 (c)(1),
(2) Date: Oct. 18, 2024

(87) PCT Pub. No.: WO2023/204867
PCT Pub. Date: Oct. 26, 2023

(65) Prior Publication Data
US 2025/0120507 A1    Apr. 17, 2025

(51) Int. Cl.
| | |
|---|---|
| *B43L 1/10* | (2006.01) |
| *A47B 97/00* | (2006.01) |
| *B43L 1/08* | (2006.01) |
| *F16B 12/26* | (2006.01) |

(52) U.S. Cl.
CPC .............. *A47B 97/001* (2013.01); *B43L 1/08* (2013.01); *B43L 1/10* (2013.01); *F16B 12/26* (2013.01)

(58) Field of Classification Search
CPC ............... B43L 1/00; B43L 1/008; B43L 1/10
USPC ......................................................... D19/113
See application file for complete search history.

(56) References Cited

U.S. PATENT DOCUMENTS

| | | | |
|---|---|---|---|
| 4,437,639 | A | 3/1984 | Stein |
| D359,509 | S | 6/1995 | Fei |
| D361,347 | S | 8/1995 | Adler |
| D364,642 | S | 11/1995 | Adler |
| D624,125 | S | 9/2010 | Loguercio |
| 8,267,363 | B2 | 9/2012 | Begic et al. |
| 8,333,026 | B2 | 12/2012 | Southard |
| 8,528,871 | B2 | 9/2013 | Begic et al. |

(Continued)

FOREIGN PATENT DOCUMENTS

| | | |
|---|---|---|
| CA | 2933930 A1 | 12/2017 |
| JP | 2587841 B2 | 3/1997 |

(Continued)

*Primary Examiner* — Kurt Fernstrom
(74) *Attorney, Agent, or Firm* — Simpson & Simpson, PLLC

(57) ABSTRACT

A whiteboard having a mounting assembly having a semi-flexible substrate having a design face and a mounting face, said design face including printed indicia having high contrast outlines, and a mounting assembly, having a star socket having a contoured face, a centrally arranged aperture circumscribed by a plurality of tabs, each of the end of the plurality of tabs contoured in a direction towards a base, a stud plate having a stud extending from a base, the stud having a annular ring arranged thereon, the base of the stud plate arranged to be removably secured to an external structure, wherein the stud of the stud plate is arranged to be frictionally secured within the aperture such that the annular ring of the stud creates interference with the each of the end of the plurality of tabs of the star socket.

20 Claims, 18 Drawing Sheets

(56) References Cited

U.S. PATENT DOCUMENTS

| | | |
|---|---|---|
| 8,529,271 B2 | 9/2013 | Savatovich |
| 8,591,131 B2 | 11/2013 | Rhodes |
| D712,963 S | 9/2014 | Fleet |
| 9,090,116 B2 | 7/2015 | Tunis et al. |
| D744,588 S | 12/2015 | Cruickshank |
| 9,624,963 B2 | 4/2017 | Shi |
| D828,447 S | 9/2018 | Cohen |
| 10,687,638 B1 | 6/2020 | Ghofranian et al. |
| 2002/0061508 A1* | 5/2002 | Vocia ........................ B43L 1/00 434/409 |
| 2003/0077563 A1 | 4/2003 | Farmer |
| 2009/0266964 A1 | 10/2009 | Hung |
| 2010/0129144 A1 | 5/2010 | Osborne |
| 2013/0216735 A1* | 8/2013 | Fleet ........................ B43L 1/008 428/14 |
| 2013/0280691 A1* | 10/2013 | O'Connor ............... G09B 19/00 434/408 |
| 2014/0030693 A1 | 1/2014 | Dynlacht |
| 2016/0257162 A1 | 9/2016 | Cruickshank |
| 2017/0071365 A1 | 3/2017 | Li |
| 2017/0197153 A1* | 7/2017 | Styles ........................ B43L 1/00 |
| 2022/0314685 A1* | 10/2022 | Franco ...................... B43L 1/12 |

FOREIGN PATENT DOCUMENTS

| | | |
|---|---|---|
| JP | 3347304 B2 | 11/2022 |
| WO | 2006/099734 A1 | 9/2006 |

* cited by examiner

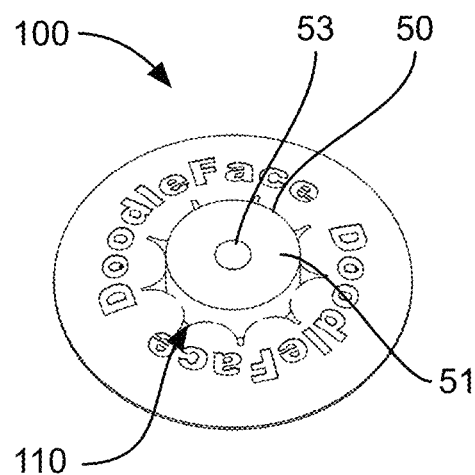
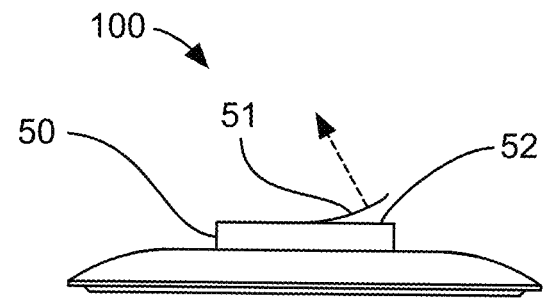
FIG. 18A  FIG. 18B
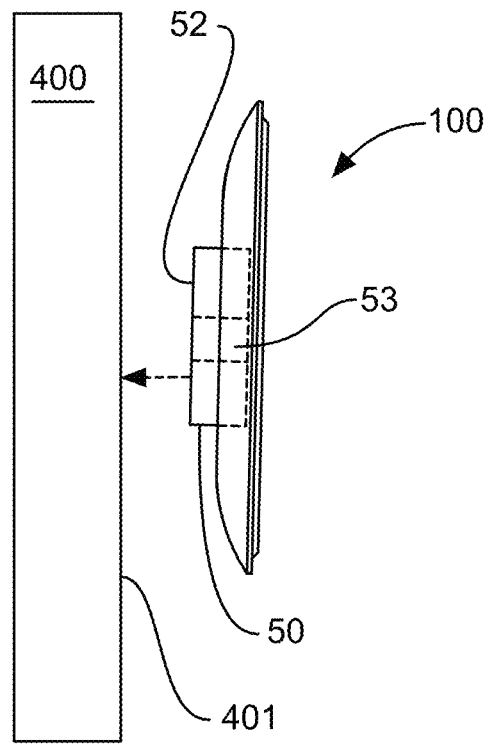
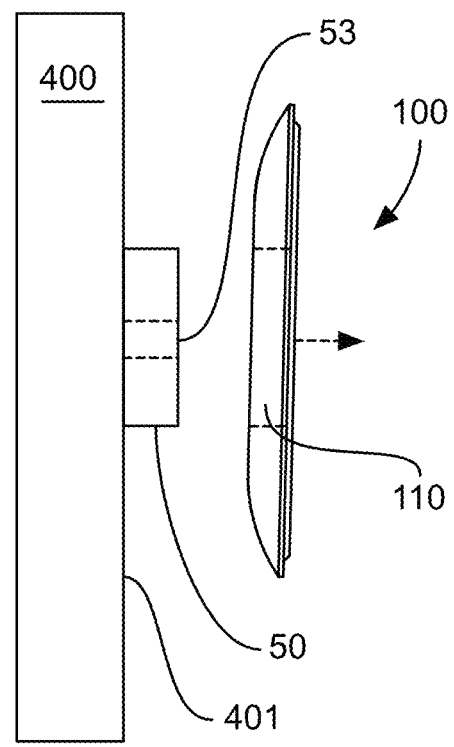
FIG. 18C  FIG. 18D

WHITEBOARD SUBSTRATE WITH MOUNTING ASSEMBLY

FIELD

The present disclosure relates to a decorative whiteboard having printed indicia defining coloring areas and a mounting assembly.

BACKGROUND

Children have always been encouraged to color "between the lines" as a tool to develop fine motor skills in their writing hands. However, children are prone to coloring on objects that are undesirable, such as walls or carpets. Children also like to proudly display their work—for example, when a parent or guardian displays a completed piece on a fridge. Whiteboards can be hung on walls, but generally are plain in shape and lack the artistic composition that childrens' coloring books have. Moreover, mounting a large whiteboard on a wall can be a difficult task as it is nearly impossible to see the mounting locations on the respective wall during installation.

Thus, there is a long-felt need for an apparatus that allows children to practice coloring "between the lines" that comes in a variety of different designs which can also be mounted on a wall for display.

There is another long-felt need for a simple mounting assembly that securely but removably allows fixtures to be mounted on a wall, which is also structurally designed to accommodate self-centering of two mounting pieces to make the mounting process easier without the benefit of seeing the mounting pieces during installation.

SUMMARY

The present invention broadly comprises a whiteboard having a mounting assembly including a semi-flexible substrate having a design face and a mounting face, the design face including printed indicia having high contrast outlines; and, a mounting assembly, the mounting assembly including a star socket having a contoured face extending from a base, the contoured face having a centrally arranged aperture circumscribed by a plurality of tabs, each of the plurality of tabs having an end arranged proximate to a center point of the base, the each of the end of the plurality of tabs contoured in a direction towards the base, the base fixedly secured to the mounting face of the semi-flexible substrate, a stud plate having a stud extending from a base, the stud having a annular ring arranged thereon, the base having a centrally arranged through-bore, the base of the stud plate arranged to be removably secured to an external structure, wherein the stud of the stud plate is arranged to be frictionally secured within the aperture such that the annular ring of the stud creates interference with the each of the end of the plurality of tabs of the star socket.

The present invention also comprises a whiteboard having a semi-flexible substrate having an outwardly facing design surface of a first color and an opposing inwardly facing surface, the outwardly facing design surface having an outer border about the entire perimeter thereof, the outer border comprising printed indicia of a second color which contrasts with the first color, wherein the outer border defines the shape of an object, the outwardly facing design surface further comprising at least one inner border, wherein the at least one inner border intersects at least the outer border at two points, or intersects at least one inner border at one point and the outer border at one point, or intersects at least one other inner border at one point and a different inner border at a second point, wherein each of the at least one inner border comprises printed indicia of a third color which contrasts with the first color, wherein the inner and outer borders intersect one another in such a way as to create discrete portions of the design surface and function as to create lines of demarcation between adjacent portions to define a surface area of the portions to be filled with a specific color of removable printed indicia.

The present invention further comprises a whiteboard having a semi-flexible substrate having an outwardly facing design surface of a first color and an opposing inwardly facing surface, the outwardly facing design surface having an outer border about the entire perimeter thereof, the outer border comprising printed indicia of a second color which contrasts with the first color, wherein the outer border defines the shape of an object, the outwardly facing design surface further comprising at least one inner border, wherein the at least one inner border intersects at least the outer border at two points, or intersects at least one inner border at one point and the outer border at one point, or intersects at least one other inner border at one point and a different inner border at a second point, wherein each of the at least one inner border comprises printed indicia of a third color which contrasts with the first color, wherein the inner and outer borders intersect one another in such a way as to create discrete portions of the design surface and function as to create lines of demarcation between adjacent portions to define a surface area of the portions to be filled with a specific color of removable printed indicia, and a mounting assembly, the mounting assembly including a star socket having a contoured face extending from a base, the contoured face having a centrally arranged aperture circumscribed by a plurality of tabs, each of the plurality of tabs having an end arranged proximate to a center point of the base, the each of the end of the plurality of tabs contoured in a direction towards the base, the base fixedly secured to the mounting face of the semi-flexible substrate; a stud plate having a stud extending from a base, the stud having a annular ring arranged thereon, the base having a centrally arranged through-bore, the base of the stud plate arranged to be removably secured to an external structure, wherein the stud of the stud plate is arranged to be frictionally secured within the aperture such that the annular ring of the stud creates interference with the each of the end of the plurality of tabs of the star socket A general object of this invention is to provide a whiteboard and a mounting assembly.

A further object of this invention is to provide a whiteboard having a design face, where the border of the design face is of a color that contrasts with the color of the design face such that the border designates an external line of demarcation and the whiteboard also includes a plurality of lines of demarcation arranged within the external border where the plurality of internal lines of demarcation are of a color that contrasts with the color of the design face, whereas the external border and the plurality of internal lines of a demarcation create shapes on the design face.

Another object of the invention is to provide for a whiteboard having a design face arranged on a substrate, where the substrate is arranged to accept removable markings, i.e., dry-erase type markings.

Another further object of the invention is to provide a mounting assembly that is self-centering, where the assembly includes a socket-like member having an aperture that is arranged to center a stud of a stud-like member therein.

A still further object of the invention is to provide for a mounting socket having a star-like aperture circumscribed by a plurality of tabs, where the plurality of tabs is arranged to provide interference against a stud protrusion that is arranged on a stud plate when the stud protrusion of the stud plate is inserted within the star-like aperture of the mounting socket, holding the stud therein.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 18A illustrates a perspective view of star socket 100 with screw positioning foam 50 within aperture 110;

FIG. 18B illustrates a side view of star socket 100 with screw positioning foam 50 within aperture 110;

FIG. 18C illustrates a side view of screw positioning foam 50 within star socket 100 being adhered to a wall; and, FIG. 18D illustrates a side view of screw positioning foam 50 adhered to a wall.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "wall" is intended to mean any of various permanent upright constructions having a length greater than its thickness and presenting a continuous surface except where pierced by doors, windows, etc. It is intended to include well-known wallboard having planar surface but can also include structures having non-planar (curved) or irregular surfaces.

It should also be appreciated that directional terms used herein are relative to the corresponding figure being described. For example, "leftward" or "rightward", "top" or "bottom", are relative to the figure as illustrated on a particular sheet, therefore "leftward" is referring to the left side of an illustration as depicted.

Figure 1A:
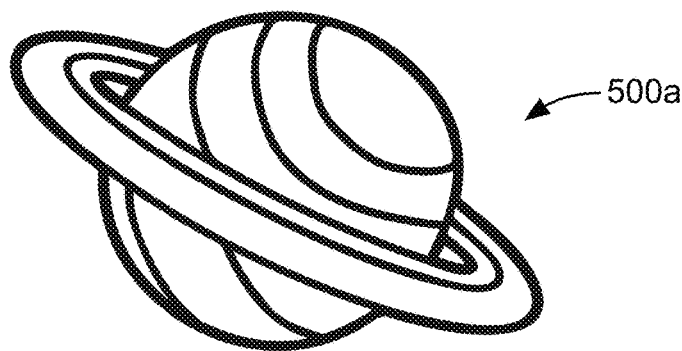
FIG. 1A is a first representative design of the present invention.
Figure 1B:
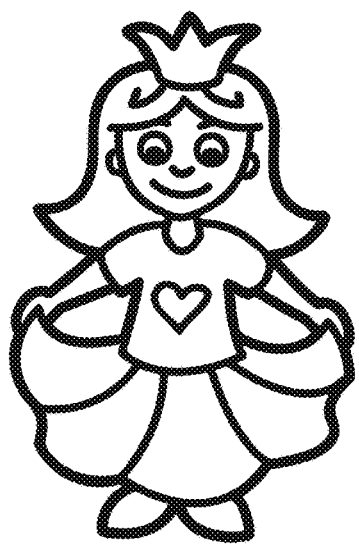
FIG. 1B is a second representative design of the present invention.
Figure 1C:
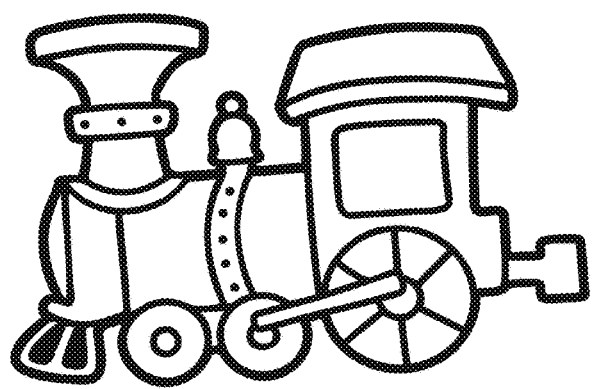
FIG. 1C is a third representative design of the present invention.
Figure 1D:
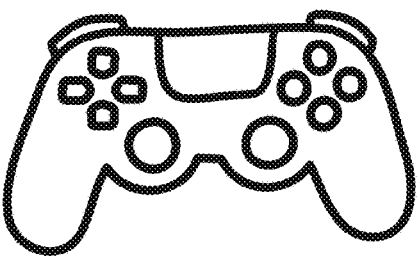
FIG. 1D is a fourth representative design of the present invention.
Figure 1E:
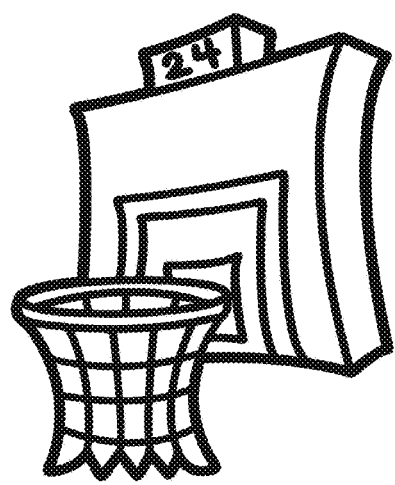
FIG. 1E is a fifth representative design of the present invention.
Figure 1F:
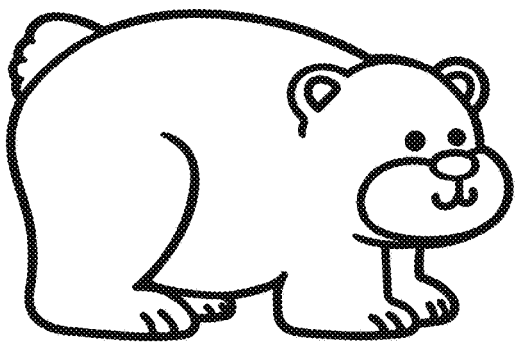
FIG. 1F is a sixth representative design of the present invention.

Referring now to the figures, the following description should be taken in view of FIGS. 1A-1F. At the outset, it should be appreciated that the present invention relates to "designs" where a design is intended to mean a graphic image of a person, place, animal, object or thing. The claims are not intended to be limited to any one particular design, although, for purposes of explanation and understanding, a plurality of representative designs are illustrated in the drawings and described herebelow. FIG. 1A shows first design 500*a* of the present invention (this first design happens to be a graphic representation of the planet Saturn, although it should be appreciated that the claims are not limited to this particular design.) FIG. 1B shows second design 500*b* of the present invention (this second design happens to be a graphic representation of a princess wearing a dress, although it should be appreciated that the claims are not limited to this particular design.) FIG. 1C shows third design 500*c* of the present invention (this third design happens to be a graphic representation of a train engine, although it should be appreciated that the claims are not limited to this particular design.) FIG. 1D shows fourth design 500*d* of the present invention (this fourth design happens to be a graphic representation of a video game controller, although it should be appreciated that the claims are not limited to this particular design.) FIG. 1E shows fifth design 500*e* of the present invention (this fifth design happens to be a graphic representation of a basketball backboard and shot clock, although it should be appreciated that the claims are not limited to this particular design.) FIG. 1F shows sixth design 500*f* of the present invention (this sixth design happens to be a graphic representation of a toy bear standing on all four legs, although it should be appreciated that the claims are not limited to this particular design.) It should be appreciated that designs 500*a*-500*f* are merely exemplary, and the designs and details of the present invention may vary greatly to depict different shapes or figures.

Figure 2:
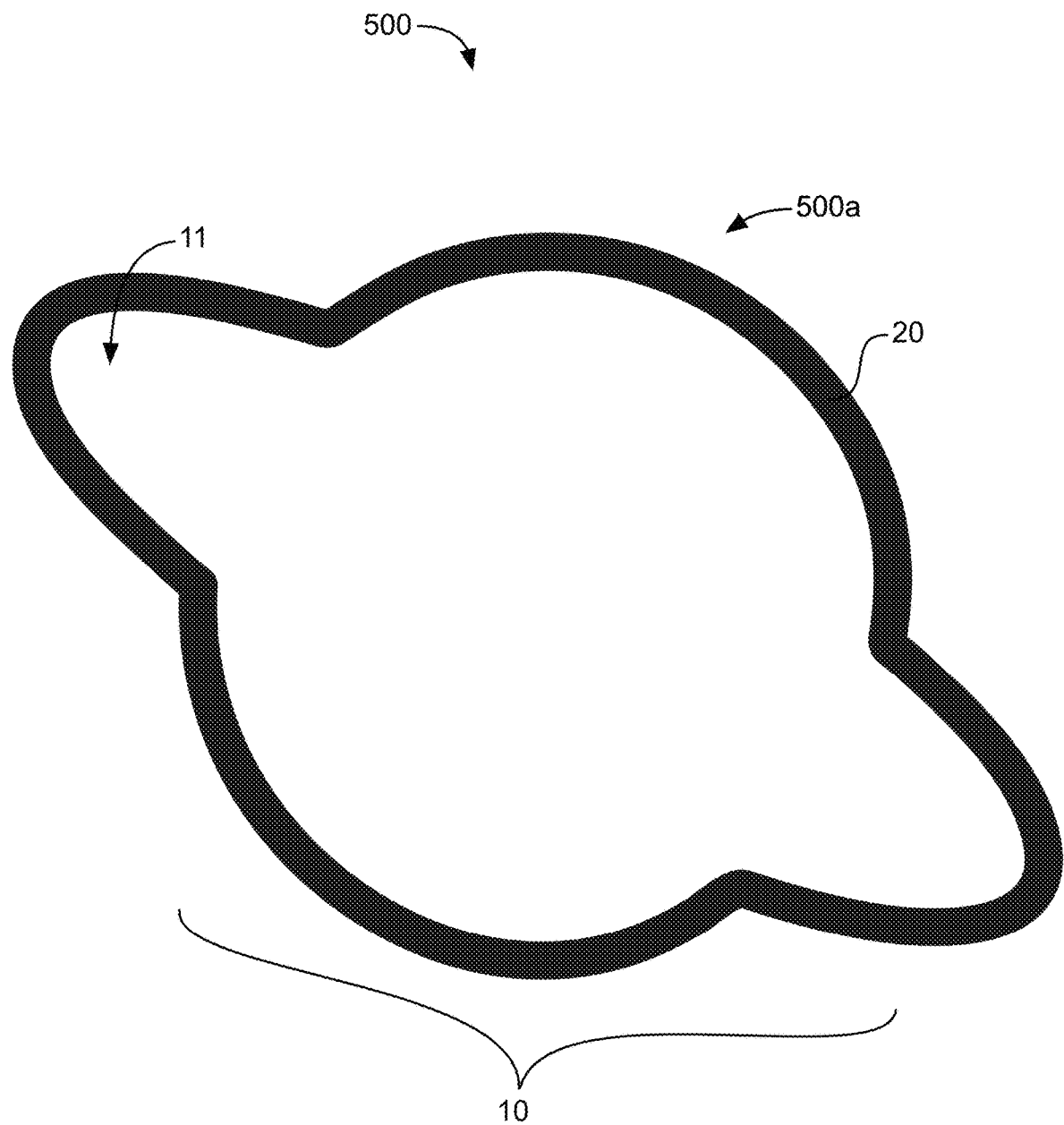
FIG. 2 is a front view of the first embodiment of the first representative design of the present invention with the lines of demarcation removed from within outer border 20.
Figure 3:
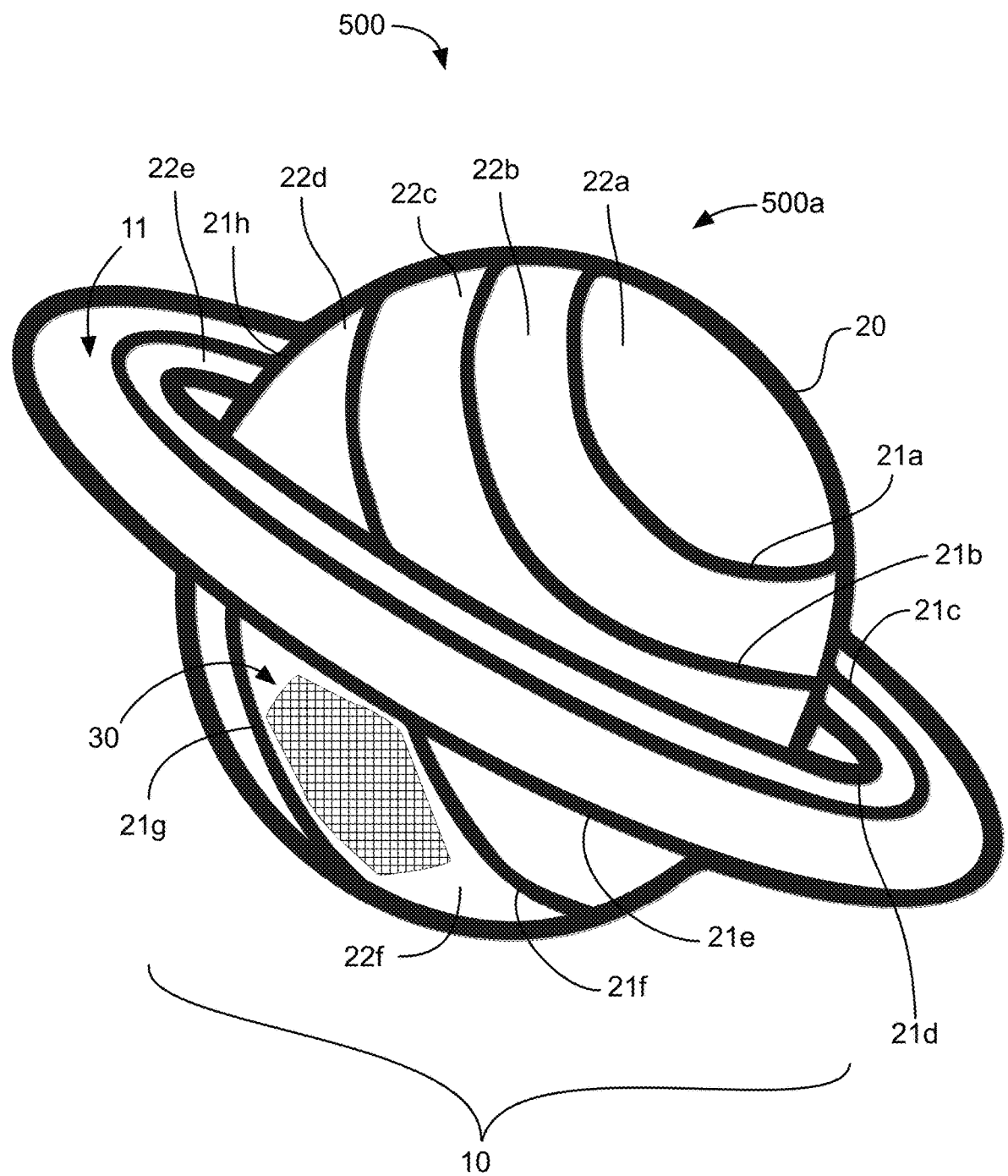
FIG. 3 is a front view of the first embodiment of the first representative design of the present invention.

The following description should be taken in view of FIGS. 2 and 3. FIG. 2 shows whiteboard 500, specifically first design 500*a*. It should be appreciated that in FIG. 2, the internal borders (shown in FIG. 3) are removed from first design 500*a* of whiteboard 500 and only outer border 20 of design 500*a* is shown. It should be appreciated that outer border 20 defines the outer perimeter of the specific shape of designs 500*a*-500*f*, shown in FIGS. 1A-1F. Outer border 20 has a thickness, or weight, that is arranged to contrast with the color of substrate 10 of whiteboard 500. The color of substrate 10 is defined by a first color and outer border 20 is defined by a second color. The first color of substrate 10 is arranged on design face 11 of whiteboard 500. Substrate 10 includes two surfaces, or faces, design face 10 and mounting face 12 (shown in FIG. 4 and described, infra). For example, the outer border might be black and the substrate might be white; the outer border might be green, blue, red, orange and the substrate might be white, yellow or pink. The claims are not intended to be limited to any specific combination of colors for the border and the substrate as a myriad of color combinations are possible as long as the border color contrasts with the substrate color.

Arranged within outer border 20 are a plurality of lines of demarcation, 21*a*-21*g*. Lines of demarcation 21*a*-21*g* are defined by having a third color which is arranged to contrast with the first color of substrate 10. In some embodiments, the second color of outer border 20 of whiteboard 500 may be the same as the third color of lines of demarcation 21*a*-21*g*.

Lines of demarcation 21*a*-21*h* and outer border 20 are arranged to define a plurality of closed shapes having a fill color which is the color of substrate 10. Lines of demarcation 21*a*-21*g* are also arranged to define closed shapes having a fill color of substrate 10 which are not bounded by outer border 20. For example, outer border 20 and line of demarcation 21*a* define shape 22*a* on design face 11; outer border 20, line of demarcation 21*a* and line of demarcation 21*b* define shape 22*b*; line of demarcation 21*c*, line of demarcation 21*d*, and line of demarcation 21*h* define shape 22*e*. Outer border 20 and lines of demarcation 21*a*-21*h* define a border of the shapes they respectively create having either the second color, the third color, or a combination of the second and third color, such that the border of the respective shape will contrast with the first color of the substrate 10.

How the respective shapes are formed on design face 11 depends on a selected arrangement of the intersections of lines of demarcation 21*a*-21*h* with outer border 20, or the intersections of lines of demarcation 21*a*-21*h* with another line of demarcation. A select number of the lines of demarcation will intersect with outer border 20, e.g., line of demarcation 21*a* intersects outer border 20 at the respective ends of line of demarcation 21*a*. A select number of lines of demarcation will intersect with outer border 20 at one end and will intersect with another line of demarcation at its opposite end, e.g., line of demarcation 21*h* intersects outer border 20 at one of its ends and intersects line of demarcation 21*d* at its opposite end. A select number of lines of demarcation will intersect with other lines of demarcation within outer border 20, e.g., line of demarcation 21*d* only intersects with other lines of demarcation and not outer border 20.

Shapes 22*a*-22*f* designate areas where removable markings should be applied to design face 11 of substrate 10 of whiteboard 500. For example, outer border 20 and lines of demarcation 21*e*-21*g* define shape 22*f* and indicate area for marking 30 to be made within the border of shape 22*f*. It should also be noted that the entirety of design face 11 may accept removable markings, however, shapes 22*a*-22*f* are the preferred marking areas to encourage children to develop good habits. More concisely, the designated areas bordered by any combination of outer border 20 with one or more lines of demarcation, or bordered by a plurality of internal lines of demarcation alone define areas where children would typically "draw within the lines" as they would in a conventional paper coloring book.

Outer border 20 and lines of demarcation 21*a*-21*h* define high-contrast borders of shapes on design face 11. The shapes indicate areas to be colored by children using removable markings on design face 11 such as dry-erase markers or dry-erase crayons, or other removable marking means. The high-contrast borders of the shapes on design face 11 encourage children to "color within the lines".

It should be noted that alternatively, lines of demarcation 21*a*-21*h* may be the same color as design face 11 of substrate 10 and that shapes 22*a*-22*f* are printed onto design face having a different color than lines of demarcation 21*a*-21*h*.

The alternative method of production still produces a high-contrast color bifurcation of lines of demarcation 21a-21h and shapes 22a-22f.

Figure 4:
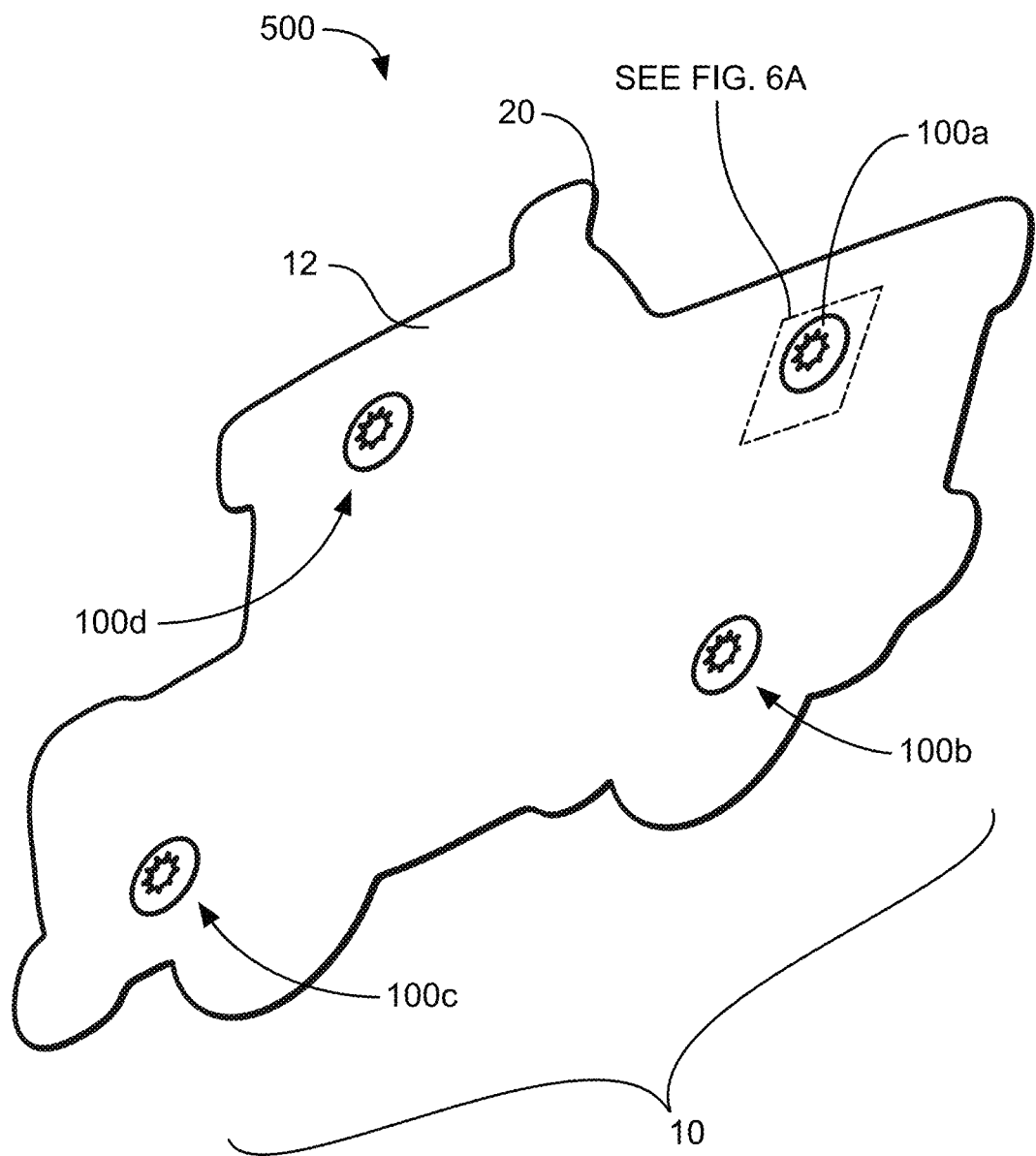
FIG. 4 is a rear perspective view of whiteboard 500.
Figure 5A:
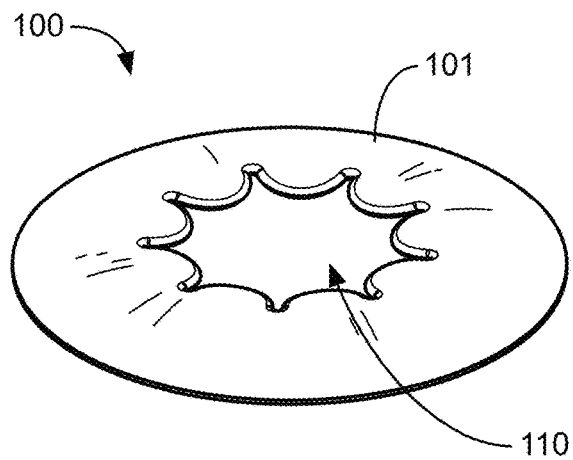
FIG. 5A is a top perspective view of star socket 100.
Figure 5B:
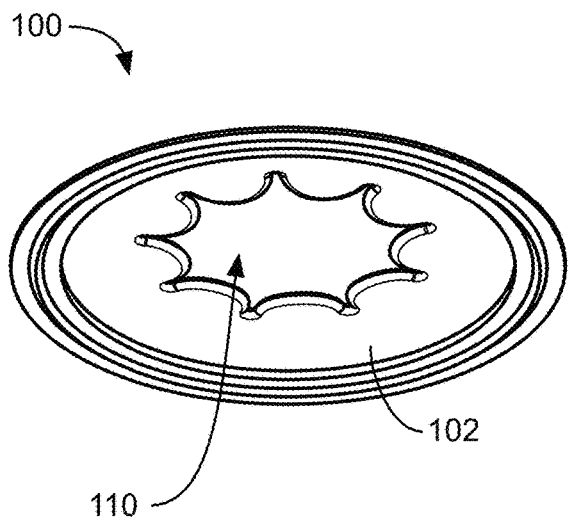
FIG. 5B is a bottom perspective view of star socket 100.
Figure 5C:
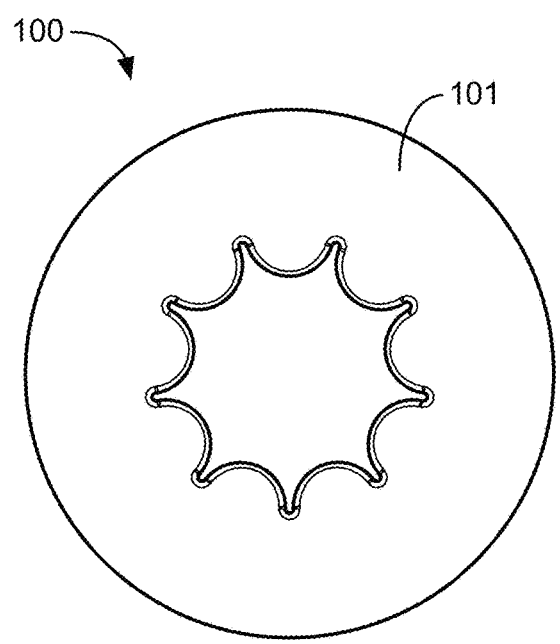
FIG. 5C is a top plan view of star socket 100.
Figure 5D:
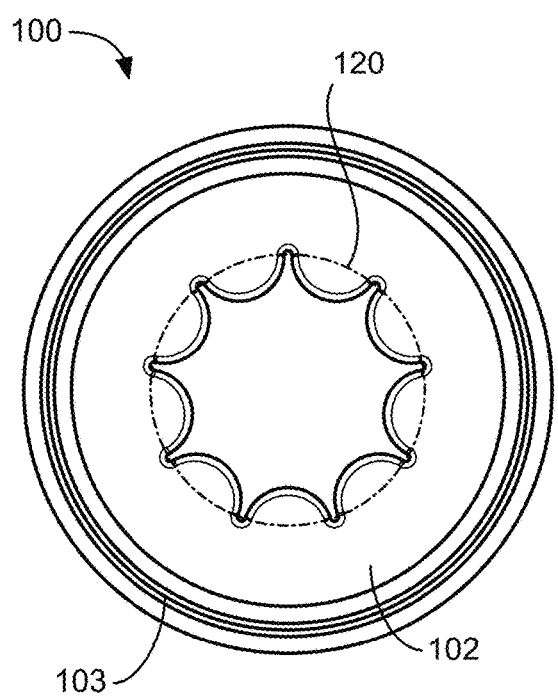
FIG. 5D is a bottom plan view of star socket 100.

FIG. 4 illustrates a rear perspective view of whiteboard 500. Mounting face 12 of whiteboard 500, as shown in FIG. 4, is opposite design face 11. In operation the mounting face functions to secure the whiteboard to a surface, such as a wall. Mounting face 12 includes a plurality of star sockets 100a-100d mounted thereon. Star sockets 100a-100d are secured to mounting face 12 via ultrasonic welding, chemical bonding, spin welding, laser welding, or other acceptable non-removable means.

The following description should be taken in view of FIGS. 5A-5D, which illustrate a plurality of views of star socket 100. Star socket 100 generally comprises contoured external face 101, internal face 102, base 103, aperture 110, and plurality of tabs 120 that define the external border of aperture 110. It should be appreciated that external face 101, internal face 102, and base 103 are integral components of star socket 100. Base 103 is an annular ring that protrudes from internal face 102, arranged proximate to the external border of star socket 100. Contoured external face 101 extends from base 103 and is arranged to have a contoured shape, where the contour, or curvature, is arranged in a direction away from base 103 and proximate aperture 110. In other words, contoured external face 101 has a contour that slopes, or curves, in a direction out and away from mounting face 12 (shown in FIG. 4) and base 103, whereas base 103 is secured on mounting face 12 (shown in FIG. 4).

Figure 6A:
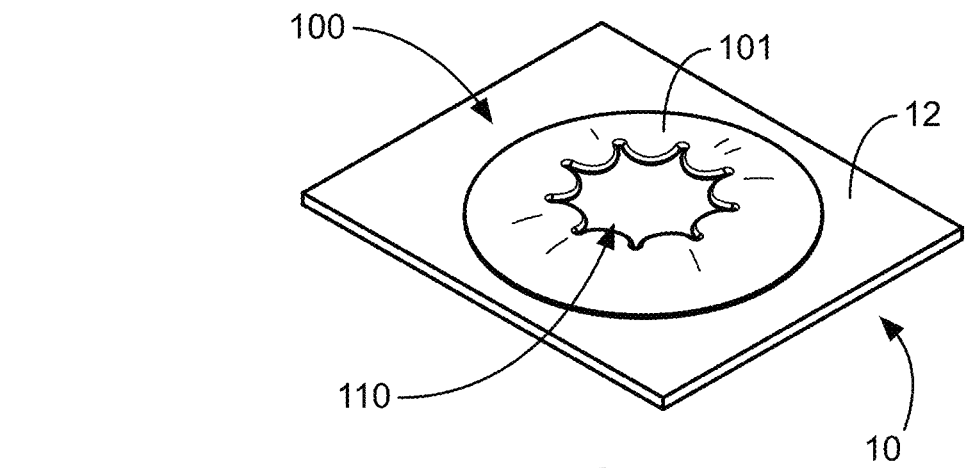
FIG. 6A is a partial perspective view of star socket 100 mounted to mounting face 12 taken from FIG. 4.
Figure 6B:
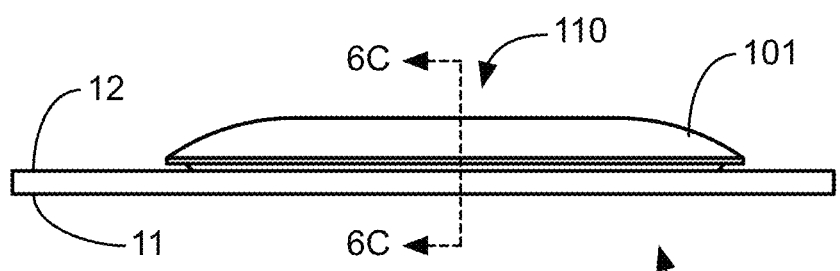
FIG. 6B is a left side view of FIG. 6A.
Figure 6C:
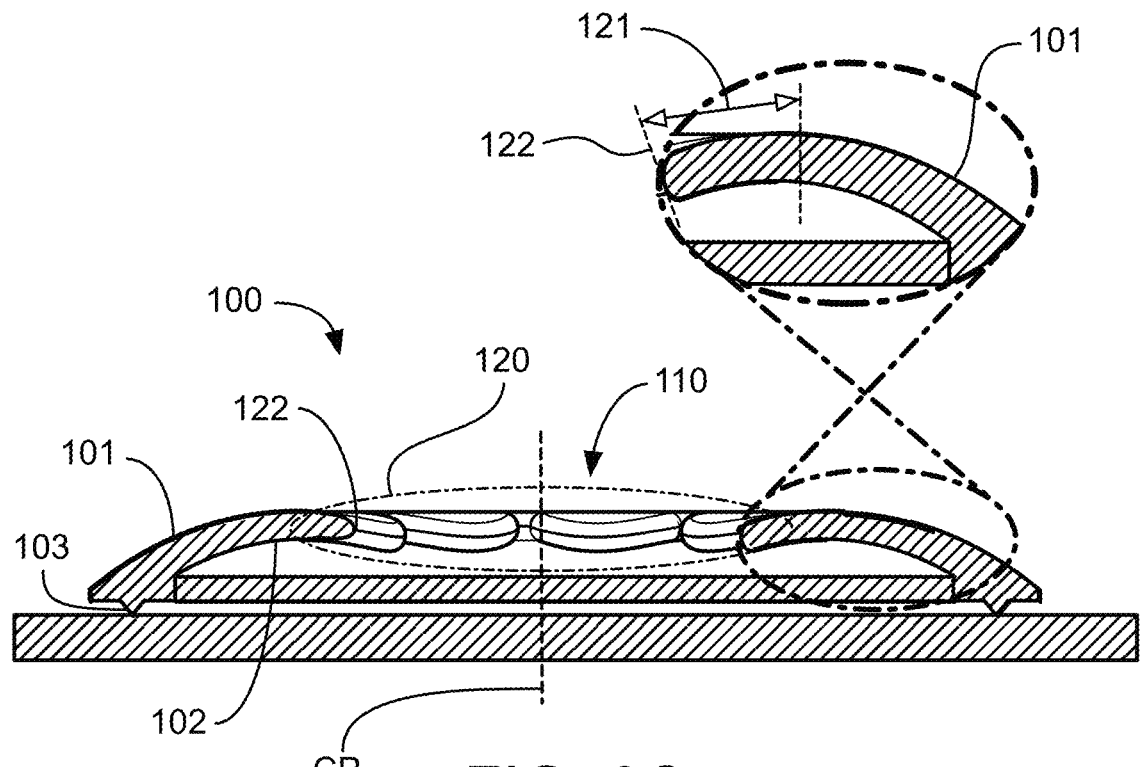
FIG. 6C is a sectional view taken along lines 6C-6C shown in FIG. 6B with a detailed section of star socket 100.
Figure 7A:
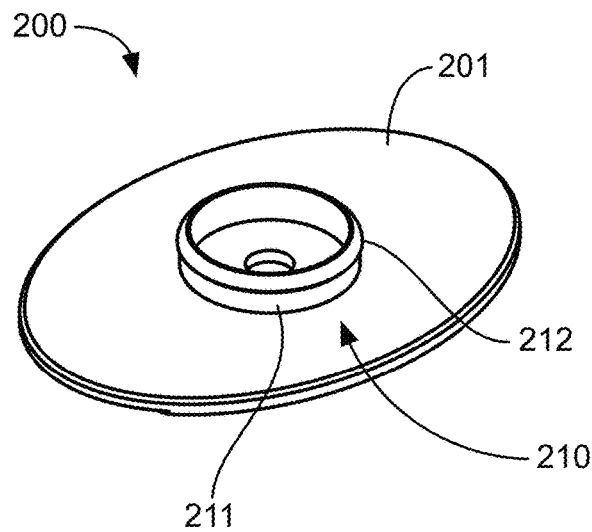
FIG. 7A is a top perspective view of stud plate 200.
Figure 7B:
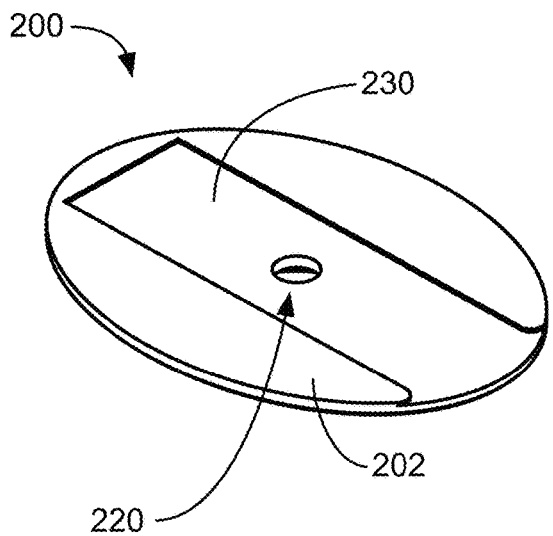
FIG. 7B is a bottom perspective view of stud plate 200.
Figure 7C:
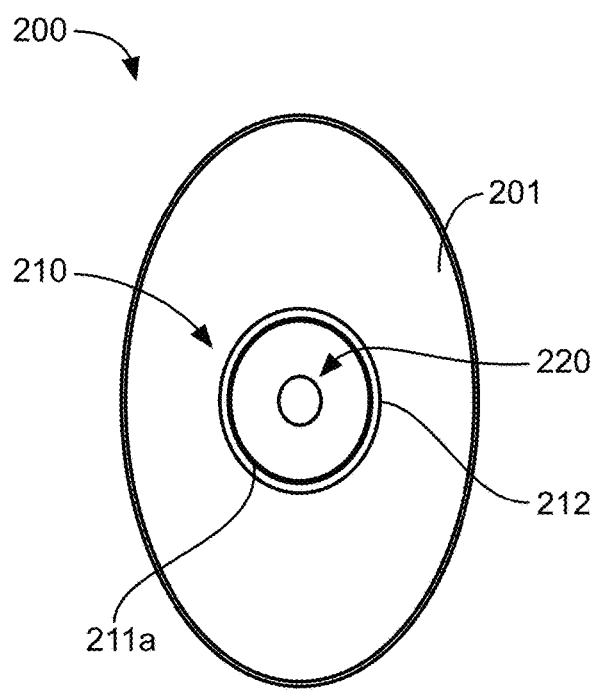
FIG. 7C is a top plan view of stud plate 200.
Figure 7D:
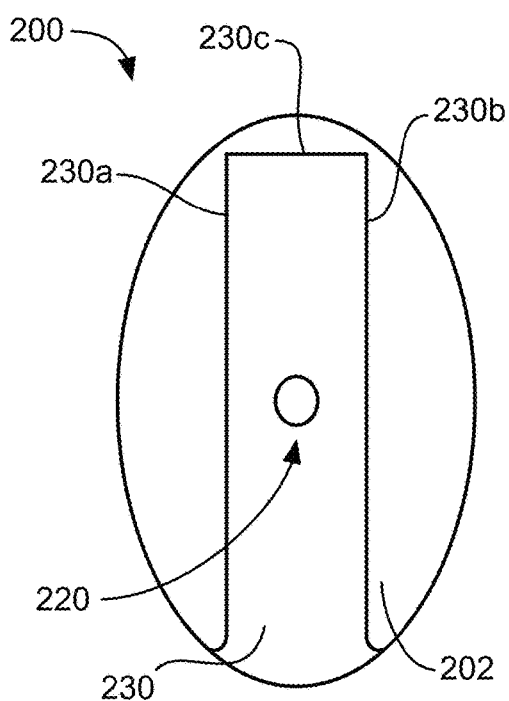
FIG. 7D is a bottom plan view of stud plate 200.

The following description should be taken in view of FIGS. 6A-6C. FIG. 6A is a partial view of star socket 100a and mounting face 12 of substrate 10 shown in FIG. 4. It should be appreciated that star socket 100a is referenced by numeral 100 in FIGS. 6A-6C and the following description applies to star sockets 100a-100d, shown in FIG. 4. In a preferred embodiment, star socket 100 is fixedly secured to mounting face 12 of substrate 10. The contoured shape of contoured external face 101 is best shown in FIGS. 6B and 6C. The contoured shape of contoured external face 101 terminates at the beginning of contoured section 121 of plurality of tabs 120, best shown in FIG. 6C. Contoured section 121 of each tab of plurality of tabs 120 are arranged to contour in the direction towards base 103. Contoured section 121 begins where the contour of contoured face 101 ends, and contoured section 121 terminates at each rounded end 122 of each tab of plurality of tabs 120. It should also be appreciated that plurality of tabs 120 each terminate proximate to center point CP of base 103.

The following description should be taken in view of FIGS. 7A-7D, which illustrate a plurality of views of stud plate 200. Stud plate 200 generally comprises external face 201, mounting face 202, stud 210, and mounting aperture 220. External face 201, mounting face 202, and stud 210 are all integral components of stud plate 200. Stud 210 comprises body 211, which is arranged to extend from external face 201, and annular ring 212, which is arranged to circumscribe the outer surface of body 211 and protrude outwardly. Mounting face 202 includes mounting channel 230, which is a cut out section that includes the open end of mounting aperture 220 on mounting face 202. Mounting channel 230 is defined by three edges: first edge 230a, second edge 230b, and third edge 230c. Mounting channel 230 is arranged to seat an adhesive strip therein, such that alternatively, stud plate 200 may be mounted via an external adhesive instead of a mounting screw (discussed in view of FIGS. 13A and 13B, infra).

Figure 8A:
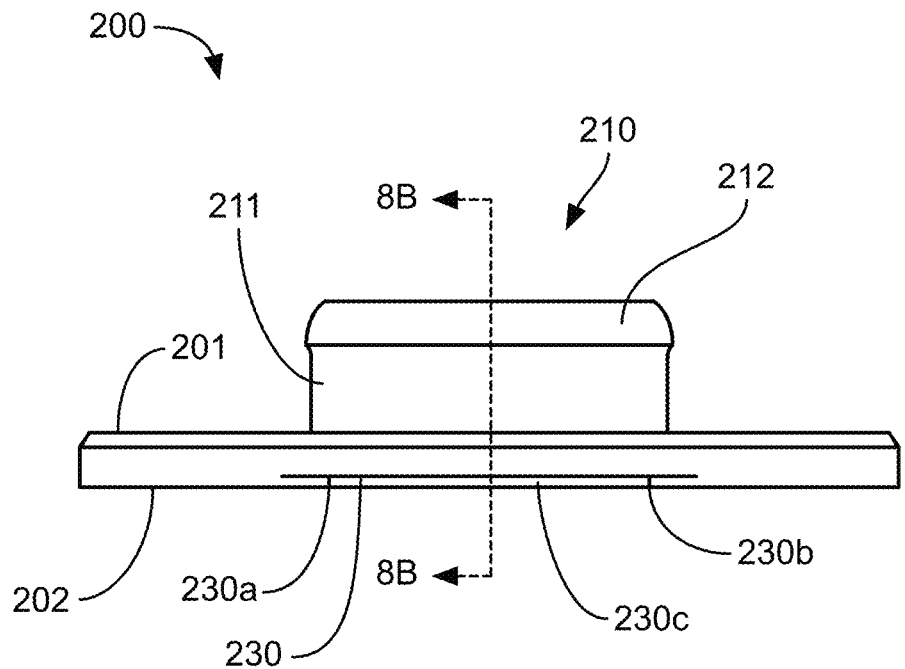
FIG. 8A is a left side view of stud plate 200 shown in FIG. 7A.
Figure 8B:
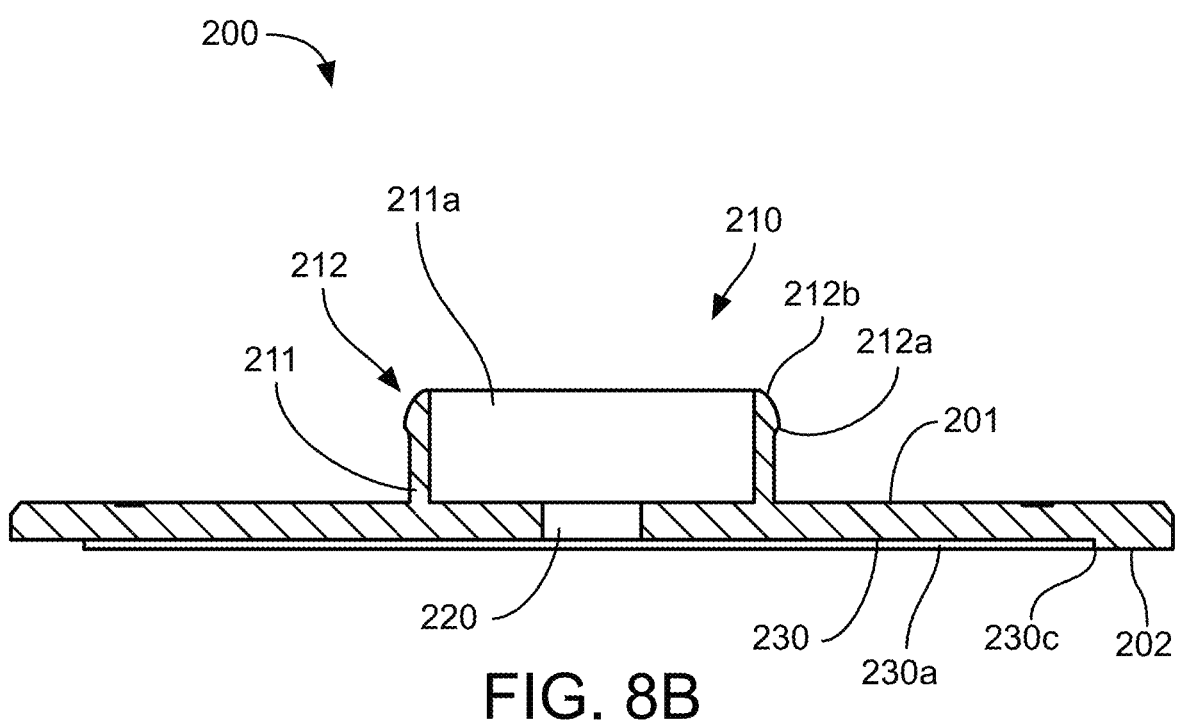
FIG. 8B is a sectional view of stud plate 200 taken along lines 8B-8B shown in FIG. 8A.

The following description should be taken in view of FIGS. 8A and 8B. Body 211 of stud 210 extends upwardly from external face 201. Annular ring 212 is arranged proximate the terminating end of stud 210, opposite of external face 201. Annular ring 212 includes two edges, lip edge 212a and curved edge 212b, arranged proximate wall 201 and arranged distally in relation to wall 201, respectively. Curved edge 212b of annular ring 212 is arranged to have a curved shaped. Lip edge 212a of annular ring 212 is arranged to have a lip, or a substantially defined edge. Mounting aperture 220 is preferably arranged in a central location relative to internal surface 211a of body 211.

Figure 9A:
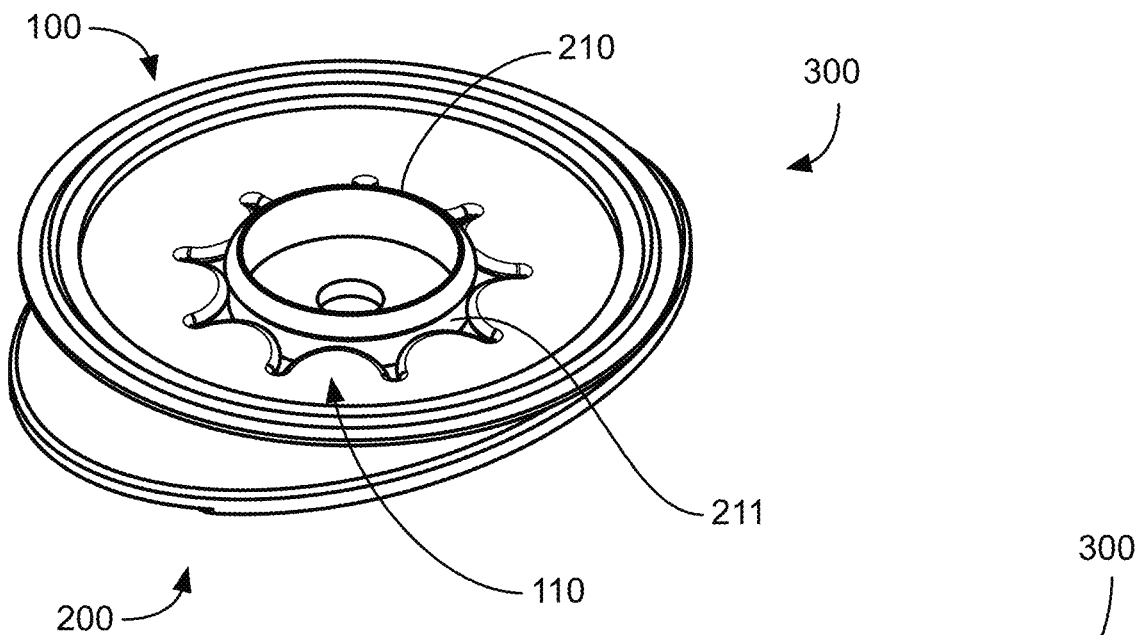
FIG. 9A is a top perspective view of star socket 100 engaged to stud plate 200.
Figure 9B:
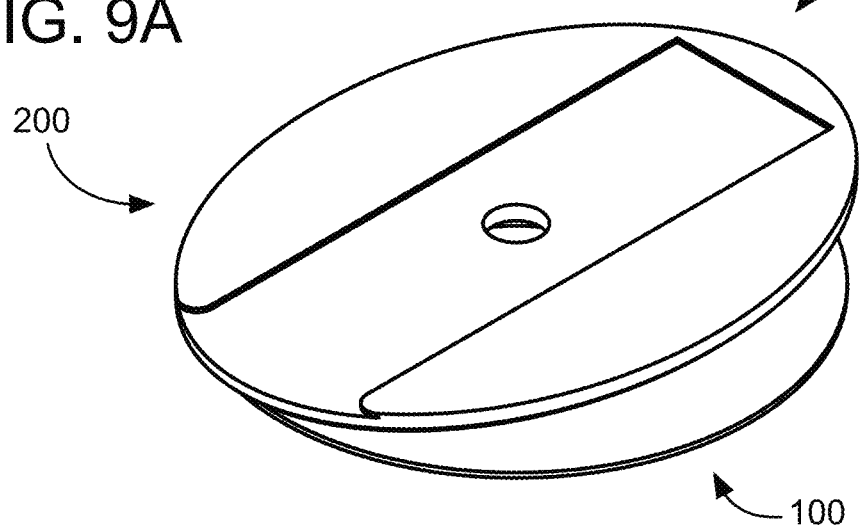
FIG. 9B is a bottom perspective view of star socket 100 engaged to stud plate 200.
Figure 9C:
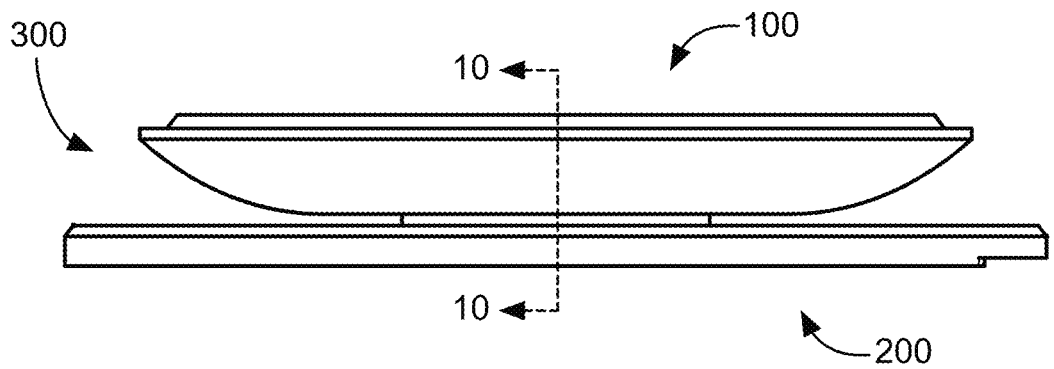
FIG. 9C is a left side view of FIG. 9A.

The following description should be taken in view of FIGS. 9A through 9C, which illustrate mounting assembly 300. Mounting assembly 300 comprises star socket 100 and stud plate 200, where stud 210 is removably secured within star aperture 110 via plurality of tabs 120. Plurality of tabs 120 are arranged to abut the external surface of body 211 of stud 210 when mounting plate 200 is engaged to star socket 100.

Figure 10:
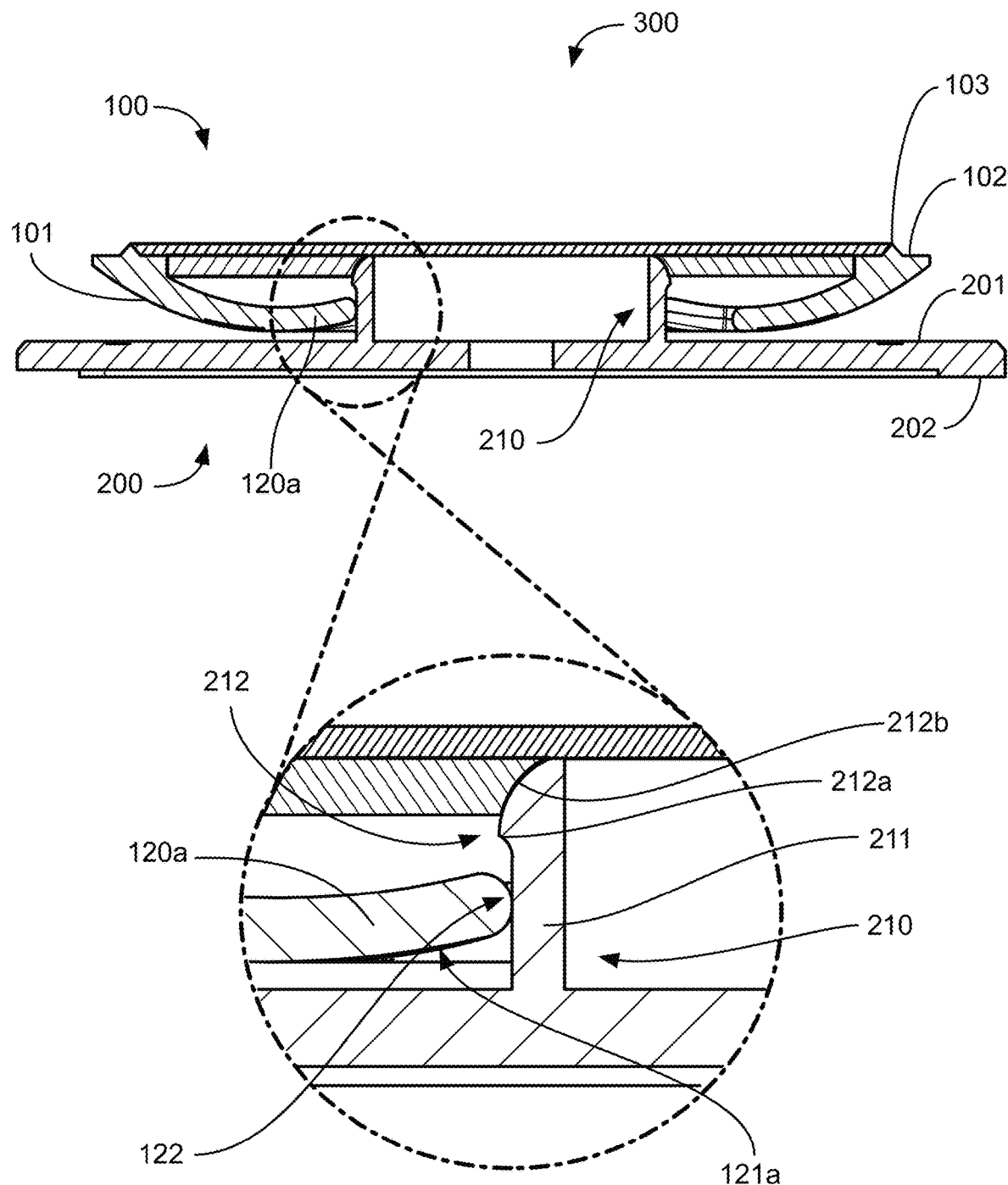
FIG. 10 is a cross-sectional view taken along lines 10-10 shown in FIG. 9C.

FIG. 10 is a cross sectional view of mounting assembly 300 taken generally along line 10-10 shown in FIG. 9C. FIG. 10 also illustrates a detailed view of stud 210 of stud plate 200 engaged within star aperture 110 of star socket 100. The following description should be taken in view of all of the aforementioned drawings. It should be noted that the description of tab 120a of plurality of tabs 120 (shown in the aforementioned drawings) applies to each tab of plurality of tabs 120. When tab 120a engages stud 210 of stud plate 200, rounded end 122a of tab 120a contacts the outer surface of body 211 of stud 210. To engage tab 120a with stud 210, tab 120a is forcibly pressed over annular ring 212 of stud 210, causing contoured section 121a of tab 120a to flex until rounded end 122a passes over curved edge 212b of annular ring 212. Once rounded end 122a of tab 120a has passed over curved edge 212b of annular ring 212, contoured section 121a of tab 120a partially unflexes such that round end 122a then abuts the surface of body 211 of stud 210. It should be appreciated that contoured section 121a of tab 120a still applies a slight force of flexion to rounded end 122a onto body 211 of stud 210, to maintain a frictional securement (of each of the tabs of plurality of tabs 120) thereon. Lip edge 212a provides a body of interference such that greater force is needed to pull rounded edge 122a of tab 120a past lip edge 212a, to disengage tab 120a from stud 210.

The force and flexion of contoured section 121a of tab 120a that is needed to pull rounded edge 122a past lip edge 212a of annular ring 212 of stud 210 is greater than the force and flexion of contoured section 121a of tab 120a that is needed to push rounded edge 122a past curved edge 212b of annular ring 212 of stud 210. It can be said that the force needed to engage star socket 100 to stud plate 200 is less than the force needed to disengage star socket 100 from stud plate 200.

Figure 11A:
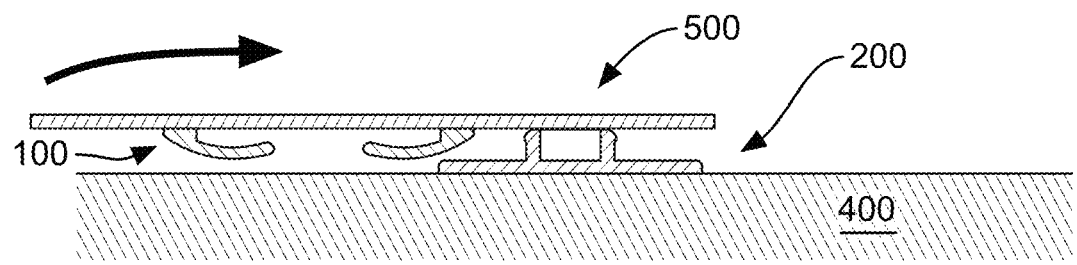
FIG. 11A is a cross-sectional view of the present invention and a wall during a first step in the installation.
Figure 11B:
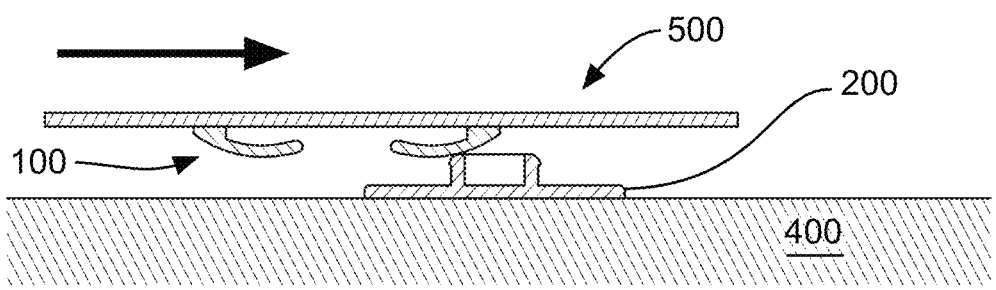
FIG. 11B is a cross-sectional view of the present invention and a wall during a second step in the installation.
Figure 11C:
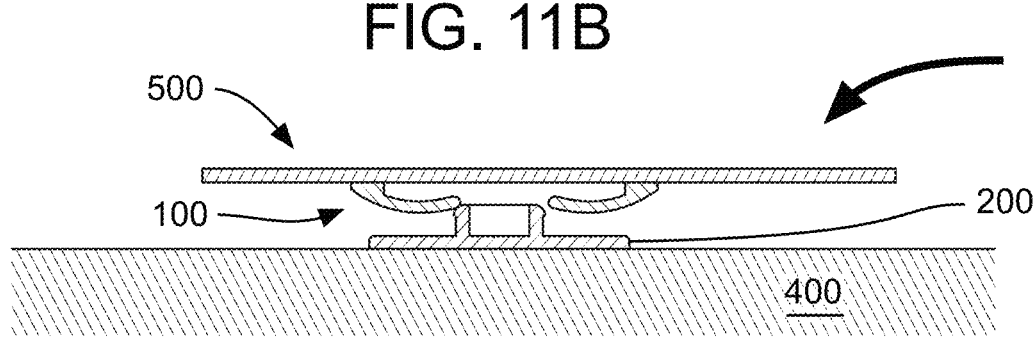
FIG. 11C is a cross-section view of the present invention and a wall during a third step in the installation.
Figure 11D:
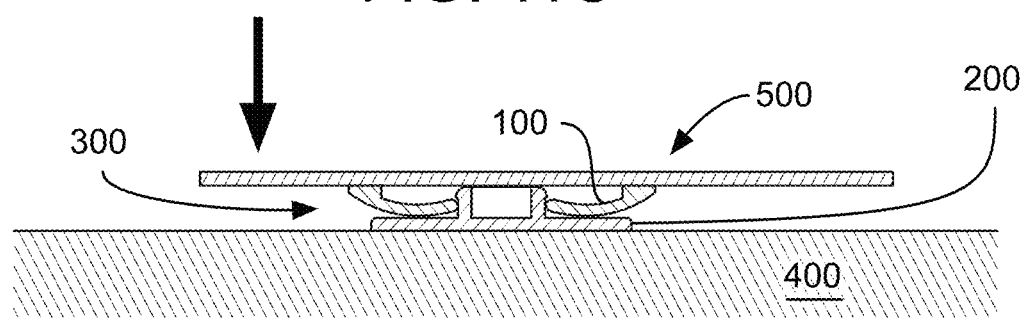
FIG. 11D is a cross-sectional view of the present invention and a wall when completely installed.
Figure 12:
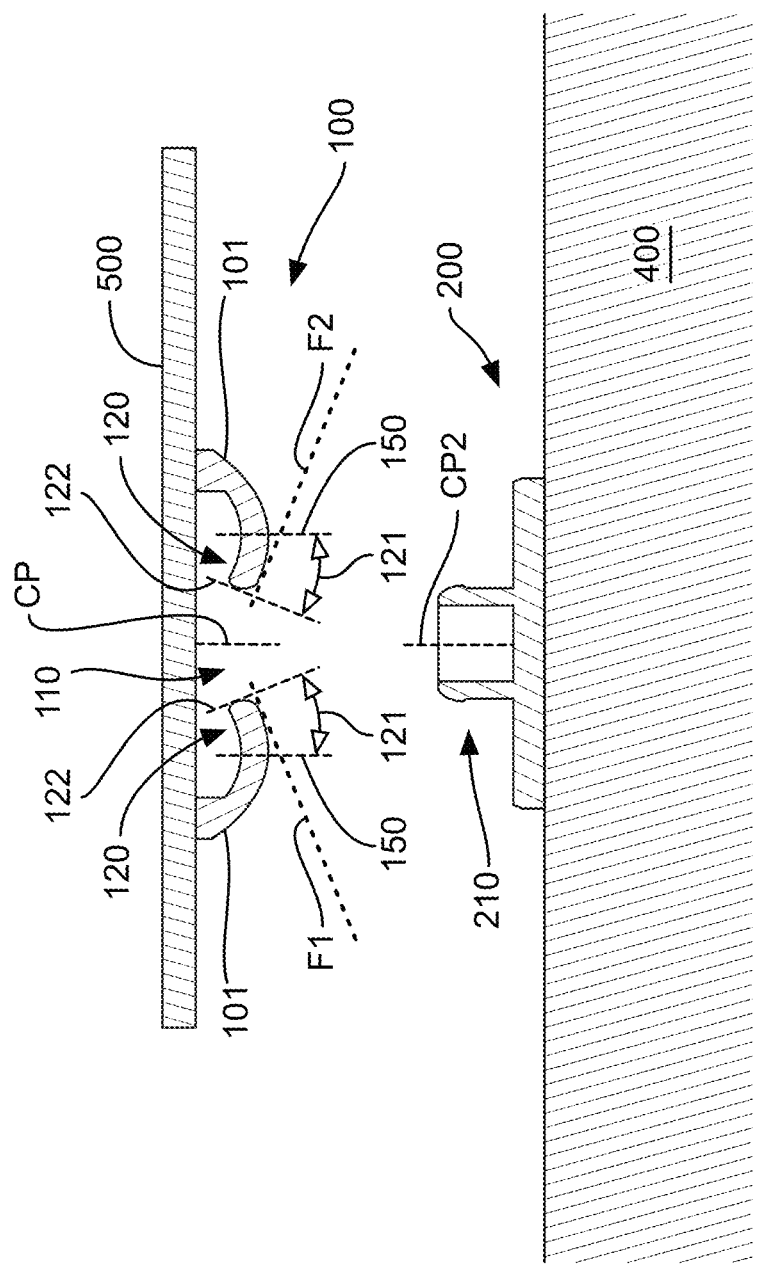
FIG. 12 is a cross-sectional view of star socket 100 secured to whiteboard 500 and stud plate 200 secured to wall 400.

The following description should be taken in view of FIGS. 5A-12. FIGS. 11A through 12 illustrate a cross-sectional view of whiteboard 500 with star socket 100 secured thereto and wall 400 with stud plate 200 secured thereto. FIGS. 11A through 11D illustrate the mounting of star socket 100 and stud plate 200, while FIG. 12 illustrates the configuration of the self-centering aspect of star socket 100.

Once stud plate 200 has been affixed to wall 400, shown and discussed in more detail infra, whiteboard 500 with star socket 100 affixed thereon, may be positioned for engaging mounting assembly 300 (i.e., when stud plate 200 is engaged with star socket 100). Whiteboard 500 and star socket 100 are moved in a direction towards stud plate 200 as shown in FIG. 11A, until contoured face 101 of star socket 100 contacts stud 210 of stud plate 200.

Once contoured face 101 of star socket 100 contacts stud 210 of stud plate, the combination of the slope of contoured face 101 and curved edge 212b of annular ring 212, allow a user to slide contoured face 101 towards the distal end of stud 210, as shown in FIG. 11B.

Then, contoured section 121 of each tab of plurality of tabs 120 allows a user to slide whiteboard 500 and star socket 100 until stud 210 is positioned in a substantially central area abutting each contoured section 121 of each tab of plurality of tabs 120, right above star aperture 110 of star socket 100, as illustrated in FIG. 11C.

A user then can apply pressure to whiteboard 500 to forcibly insert stud 210 within star aperture 110 of star socket 100 to connect star socket 100 to stud plate 200 as shown in FIG. 11D. In other words, a user can apply pressure to whiteboard 500, which flexes contoured section 121 of plurality of tabs 120 to push each rounded end 122 of each tab of plurality of tabs 120 past curved edge 212b of annual ring 211 of stud 210, as described in view of FIG. 10, supra.

FIG. 12 illustrates a cross-sectional view of star socket 100 affixed to whiteboard 500 and stud plate 200 affixed to wall 400. Contoured section 121 of each tab of plurality of tabs 120 is shown to create a funneling (centering) configuration via the curvature of contoured section 121 of each tab of plurality of tabs 120, illustrated by F1 and F2, which guides stud 210 of stud plate 200 into aperture 110 when whiteboard 500 is arranged to be mounted. Funneling configuration F1 and F2 is arranged to allow center point CP of star socket 100 and center point CP2 of stud plate 200 to be colinearly aligned when stud 210 is engaged within aperture 110. Funneling configuration F1 and F2 allows star socket 100 to have a self-centering function on stud 210. Specifically, the funneling configuration F1 and F2 of contoured section 121 allows a user to move stud 210 along contoured face 101 until stud 210 enters the funneling configuration F1 and F2—to mount whiteboard 500 on a mounted stud plate 200 without seeing stud plate 200 mounted on wall 400—by applying pressure on whiteboard 500 to push stud 210 within star socket 100 once stud 210 enters funneling configuration F1 and F2. Funneling configuration F1 and F2 is provided by the curvature of contoured section 121 of each tab of plurality of tabs 120, where that curvature is configured in a direction towards aperture 110 and towards mounted whiteboard 500.

Figure 13A:
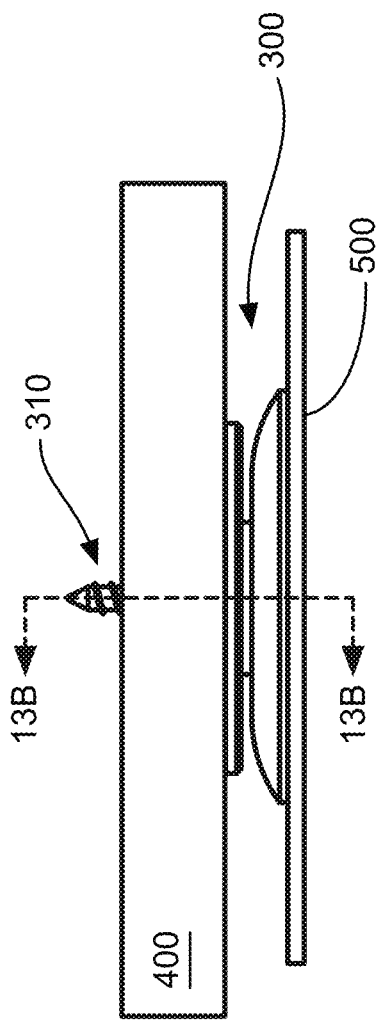
FIG. 13A is a side view of whiteboard 500 secured to wall 400.
Figure 13B:
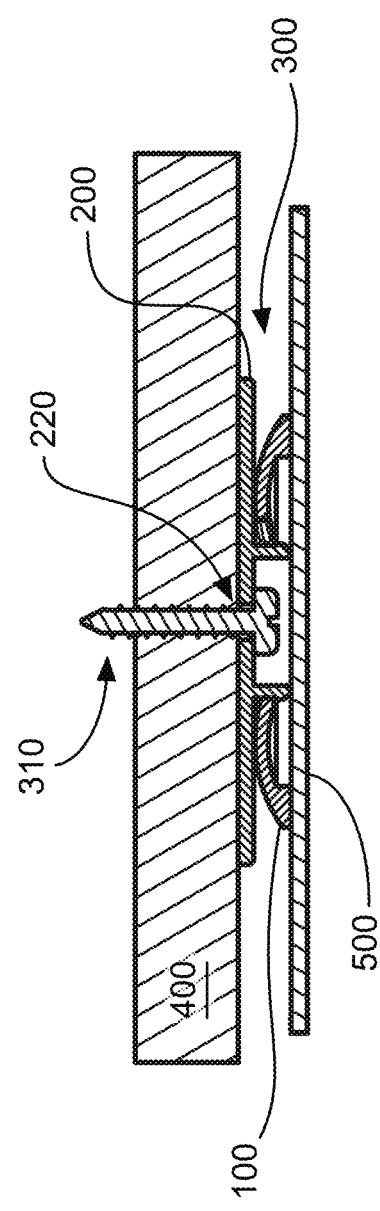
FIG. 13B is a cross-sectional view taken along lines 13B-13B shown in FIG. 13A.

The following description should be taken in view of FIGS. 13A and 13B. FIG. 13A illustrates whiteboard 500 mounted to wall 400. Specifically, FIG. 13A shows mounting assembly 300 (engaged star socket 100 and stud plate 200), where mounting screw 310 can be seen within wall 400. FIG. 13B is a cross-sectional view of FIG. 13A taken along lines 13B-13B in FIG. 13A. Mounting screw 310 is threaded through mounting aperture 220 of stud plate 200 into wall 400, threadably securing stud plate 200 to a surface of wall 400. It should be appreciated that mounting screw 310 is threaded through mounting aperture 220 and into wall 400 before star socket 100 is engaged to stud plate 200, as an engaged whiteboard 500 to star socket 100 blocks access to mounting screw 310.

Figure 14B:
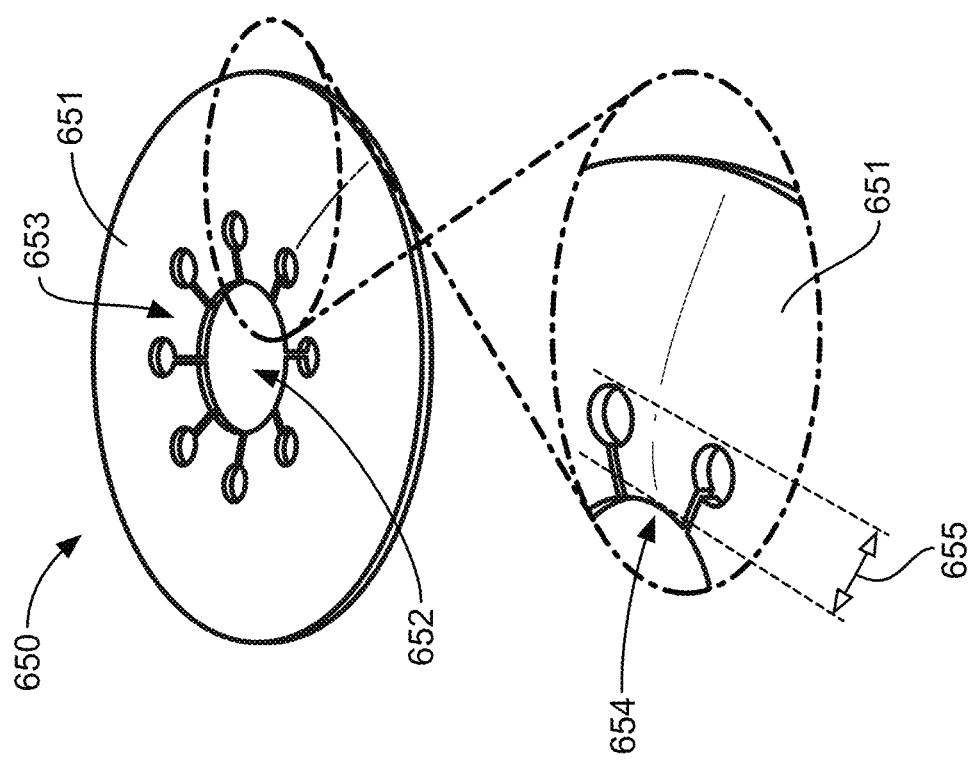
FIG. 14B is a perspective view of a second alternative embodiment of the star socket of the present invention.
Figure 14A:
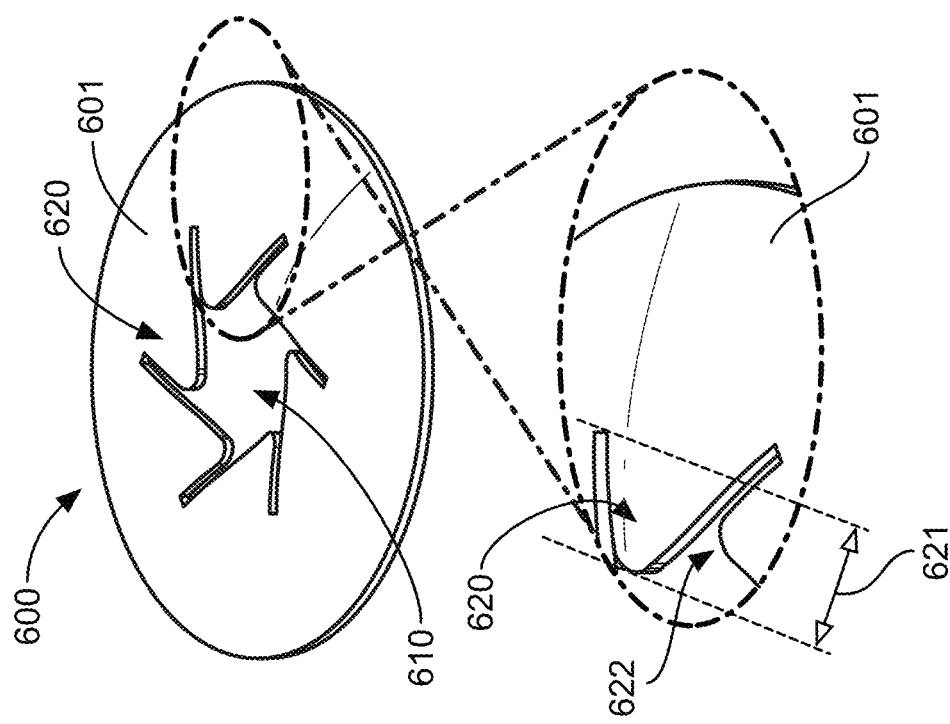
FIG. 14A is a perspective view of a first alternative embodiment of the star socket of the present invention.

FIG. 14A illustrates a perspective view of a first alternative embodiment of the star socket, star socket 600. As shown in the drawings, the number of tabs of plurality of tabs 620, may be less than plurality of tabs 120 of star socket 100 (shown in the aforementioned drawings). Star socket 600 comprises generally the same features as star socket 100, described supra. Specifically, star socket 600 includes contoured face 601, which terminates at contoured section 621 of each tab of plurality of tabs 620. Contoured section 621 terminates at each respective rounded end 622 of each tab of each tab of plurality of tabs 620. The collective rounded ends 622 of each tab of each tab of plurality of tabs 620 circumscribe star aperture 610.

FIG. 14B illustrates a perspective view of a second alternative embodiment of the star socket, star socket 620. Star socket 650 comprises generally the same features as star socket 100, described supra. Specifically, star socket 650 includes contoured face 651, which terminates at contoured section 655 of each tab of plurality of tabs 653. Contoured section 655 terminates at each respective end 654 of each tab of each tab of plurality of tabs 653. It should be appreciated that a notable difference between star sockets 100 and 600, and star socket 650, is each respective end 654 of each tab of each tab of plurality of tabs 653 of star socket 650 have an inversely oriented end 654, that is, ends 122 and 622, of star sockets 100 and 600 have a configuration that would appear to resemble a convex curvature, or outwardly arranged curve when viewed from above apertures 110 and 610, respectively (relative to the external perimeters of sockets 100 and 600), whereas end 654 of each tab of each tab of plurality of tabs 653 have a configuration that would appear to resemble a concave curvature, or inwardly arranged curve when view from above aperture 652 (relative to the external perimeter of socket 653). The collective ends 654 of each tab of each tab of plurality of tabs 653 circumscribe star aperture 652.

Figure 15A:
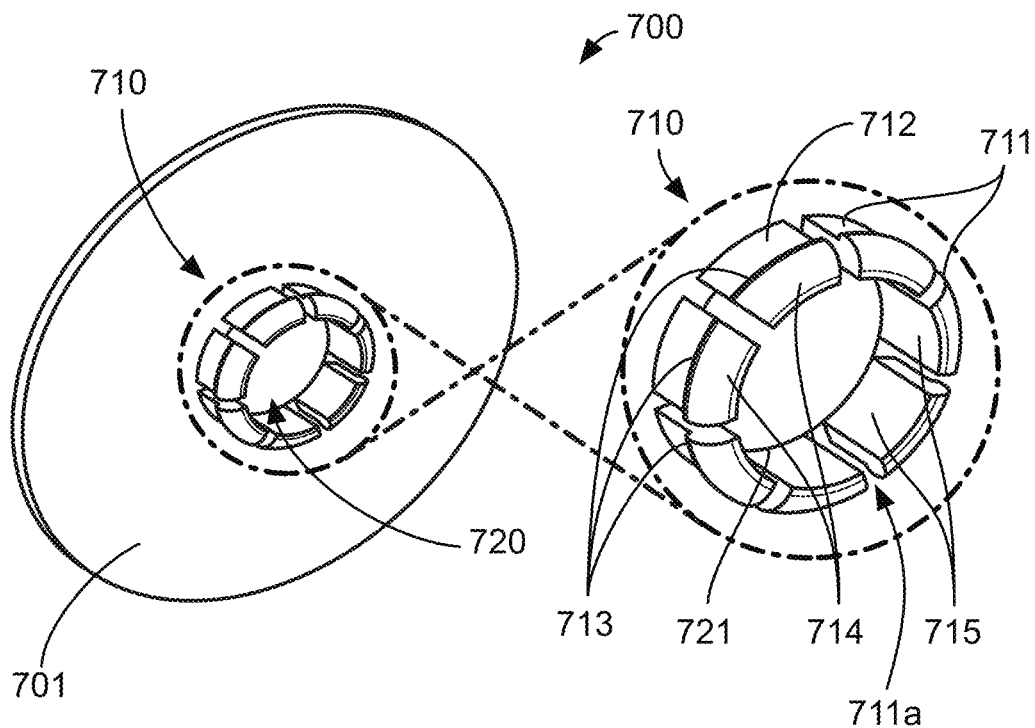
FIG. 15A is a perspective view of a first alternative embodiment of the stud plate of the present invention.
Figure 15B:
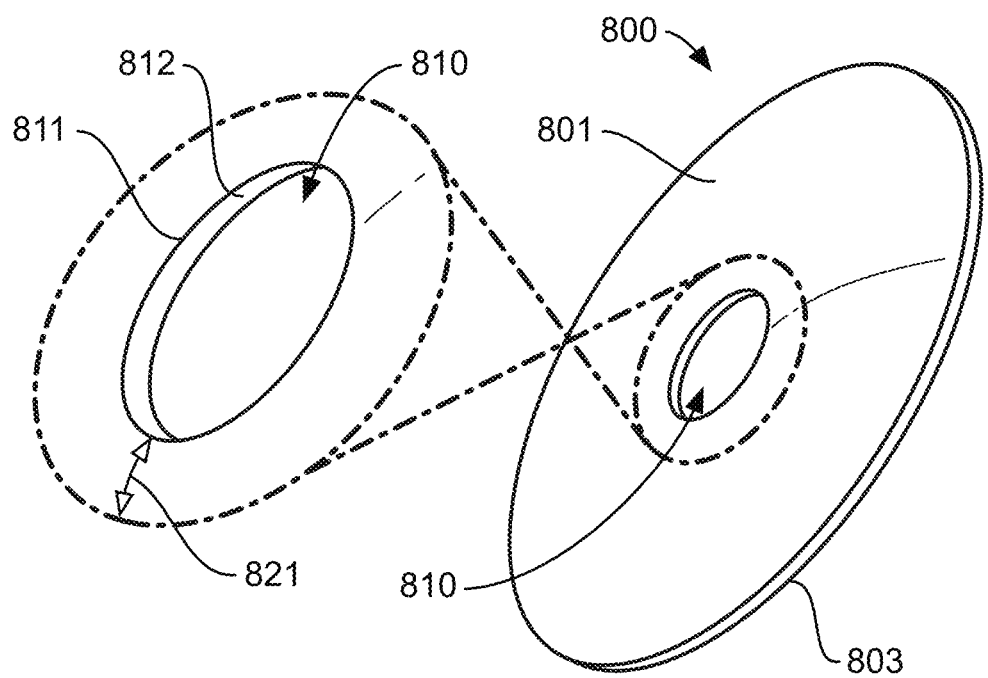
FIG. 15B is a perspective view of a third alternative embodiment of the star socket of the present invention.

The following description should be taken in view of FIGS. 15A and 15B. FIG. 15A is a perspective view of a first alternative embodiment of stud plate 100, stud plate 700, which shows a detailed perspective view of stud 710. FIG. 15B is a perspective view of a third alternative embodiment of star socket 100, star socket 800, which shows a detailed view of contoured section 821 and aperture 810. It should be noted that both stud plate 700 and socket 800 are configured to be used in conjunction with an alternative embodiment of the mounting assembly of the present invention, whereas stud plate 700 includes dynamic stud 710 and socket 800 includes fixed aperture 810. Unlike star socket 100 and stud plate 200, described supra, where star socket 100 includes a plurality of tabs that are configured to flex to create frictional tension around an engaged stud of stud plate 200, socket 800 does not comprise a plurality of tabs that circumscribe aperture 810. Inversely, dynamic stud 710 of stud plate includes a plurality of protrusions that circumscribe aperture 720 which are arranged to flex to allow dynamic stud 720 to be inserted within aperture 810 when mounting the present invention, while dynamic stud 720 imparts force on rim 822 of aperture 810 to maintain its respective position within aperture 810.

Stud plate 700 comprises external face 701 that is arranged to extend from a base arranged on the opposite side of stud plate 700, mounting aperture 720 which is arranged at a substantially central location on external face 701, and dynamic stud 710 which is arranged to circumscribe mounting aperture 720 and extend from external face 701. Stud 710 comprises plurality of protrusions 711 which circumscribe aperture 720. Plurality of protrusions 711 are preferrable uniformly spaced around outer perimeter 721 of aperture 720, creating plurality of channels 711a. Each individual protrusion of plurality of protrusions 711 includes body 712, lip 713 which extends outwardly from the external surface of body 712, and rounded end 714 which defines the terminating end of each individual protrusion of plurality of protrusions 711. Rounded end 714 is arranged to curve from terminating end of internal surface 715 of body 712 until rounded end 714 meets lip 713. The internal surface 715 of body 712 of each individual protrusion of plurality of protrusions 711 extends from outer perimeter 721 of aperture 720.

Star socket 800 is a rigid socket embodiment of star socket 100, that is, socket 800 does not have a plurality of tabs that circumscribe aperture 810. Star socket 800 comprises contoured face 801 which extends from base 803, having a contour that is curved away from a mounting face (not shown-mounting face is arranged on the surface opposite of contoured face 801). The contour of contoured face 801 terminates at contoured section 821, which has a contoured that curved towards base 803, that is, contoured section 821 has a contour arranged in a direction opposite that of contoured face 801. Contoured section 821 terminates at outer perimeter 811 of aperture 810.

Body 712 of each individual protrusion of plurality of protrusions 711 is semi-flexible, such that rounded ends 714 of stud 710 is pressed into aperture 810 of star socket 800, each individual protrusion of plurality of protrusions 711 will flex inwardly towards the center point of aperture 720 of stud plate 700 until the outer surface of each body 712 of each individual protrusion of plurality of protrusions 711 is contacting internal surface 812 of aperture 810 of star socket 800 which unflexes each body 712 of each individual protrusion of plurality of protrusions 711, but not entirely, to maintain tension on internal surface 812 of aperture 810, to keep stud 710 within aperture 810. Only a forcible removal, e.g., via pulling, will disengage stud 710 from within aperture 810.

Figure 16A:
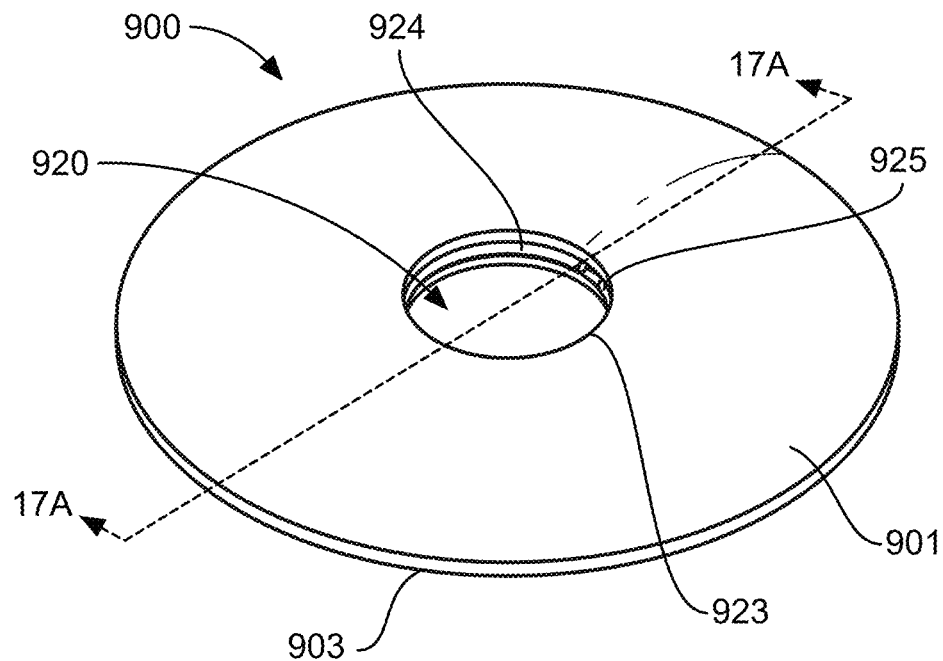
FIG. 16A is a perspective view of a fourth alternative embodiment of the star socket of the present invention.
Figure 16B:
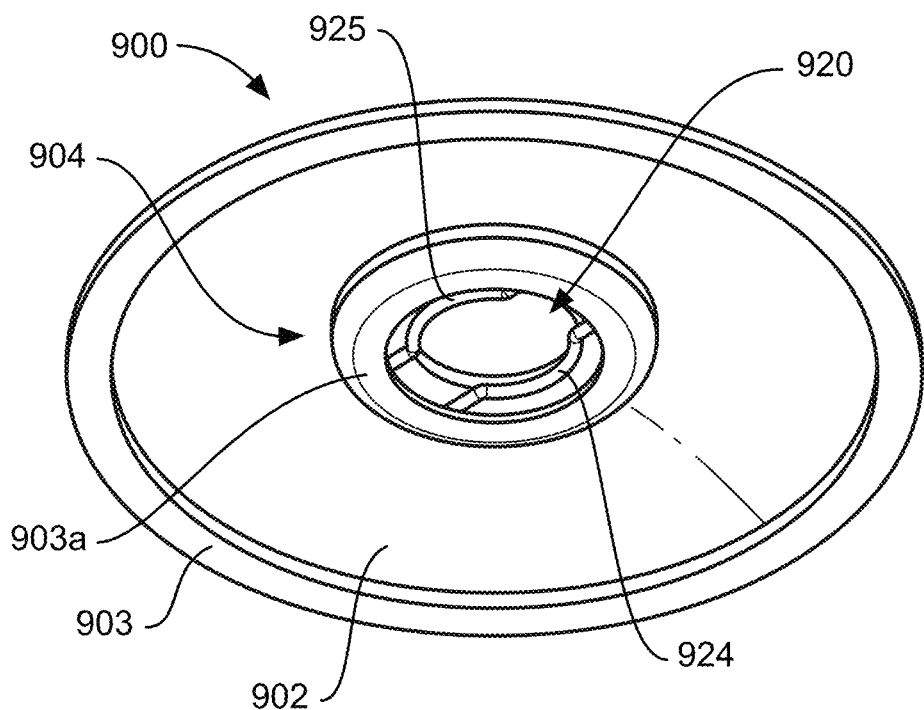
FIG. 16B is a bottom perspective view of a fourth alternative embodiment of the star socket of the present invention.

The following description should be taken in view of FIGS. 16A and 16B. FIG. 16A is a perspective view of a fourth alternative embodiment of star socket 100, star socket 900. FIG. 16B is a bottom perspective view of a fourth alternative embodiment of star socket 100, star socket 900. Like star socket 800, described supra and shown in FIG. 15B, star socket 900 lacks tabs and aperture 920 is fixed. Star socket 900 includes contoured face 901 that extends from base 903. Contoured face 901 has a configuration that is substantially identical to contoured face 101, described supra, but does not terminate at a plurality of tabs, but rather terminates at outer perimeter 923 of aperture 920. Aperture 920 is arranged in a substantially central location on contoured face 901. Extending from internal surface 902 is aperture body 904. Aperture body 904 has aperture body base 903a, which may be alternatively configured to have a colinear surface with base 903. Housed within aperture body 904 are tension wires 924 and 925 which collectively define an inner circumference that is preferably less than the inner circumference of outer perimeter 923 of aperture 920. Tension wires 924 and 925 are arranged to create interference against the annular ring of the stud plate, described supra, when the stud is inserted within aperture 920, where tension wires 924 and 925 will then impart force onto the outer surface of the body of the stud of the stud plate.

Figure 17A:
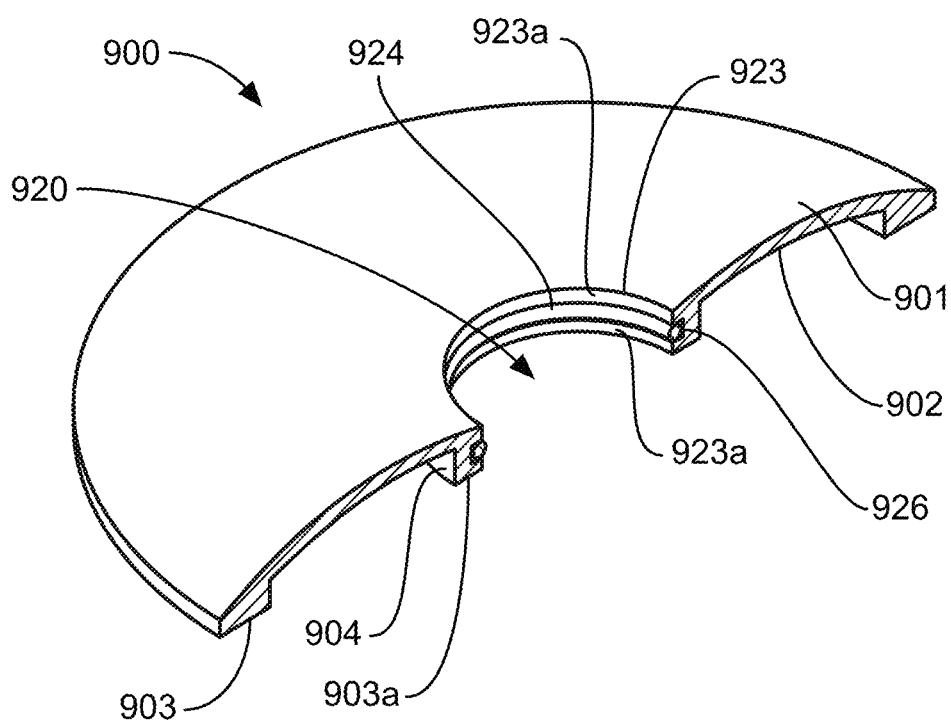
FIG. 17A is a cross-sectional view of star socket 900 taken along lines 17A-17A shown in FIG. 16A
Figure 17B:
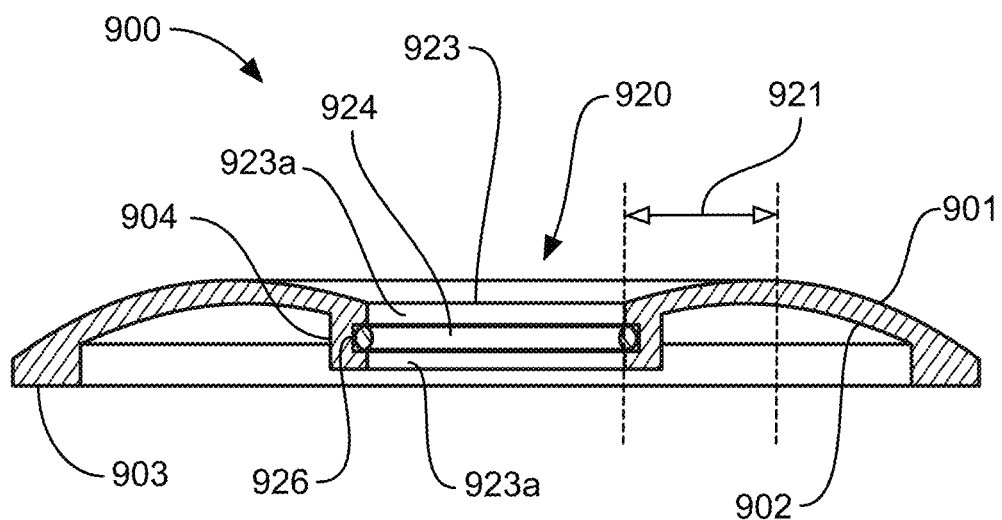
FIG. 17B is a front view of the star socket shown in FIG. 17A.

The following description should be taken in view of FIGS. 17A and 17B. FIG. 17A is a cross-sectional view of star socket 900 taken generally along line 17A-17A in FIG. 16A and FIG. 17B is a front view of the cross-section of the star socket shown in FIG. 17A. Aperture body 904 includes wire channel 926 which is arranged to fixedly secure tension wires 924 and 925. Wire channel 926 is channel arranged within inner surface 923a of aperture 920. Wire channel 926 is preferably a continuous channel. Star socket 900 also includes contour section 921 of contoured face 901. Contour section 921 is arranged to have a contour that curves in the downward direction towards base 903 and terminates at outer perimeter 923 of aperture 920.

The following description should be taken in view of FIGS. 18A and 18B. Star socket 100 is illustrated with screw positioning foam 50 positioned within aperture 110. Screw positioning foam 50 comprises adhesive layer cover 51, adhesive layer 52, and marking aperture 53. Screw positioning foam 50 is arranged to adhere to a structure, such as a wall, and provide a guide point for marking a screw hole to mount a stud plate at a marked position on a wall. To adhere screw positioning foam 50, adhesive release liner 51 is first removed to expose adhesive layer.

The following description should be taken in view of FIGS. 18B-18D. To adhere screw positioning foam 50, adhesive release liner 51 is first removed to expose adhesive layer 52, as illustrated in FIG. 18B. Then, with adhesive layer 52 facing planar face 401 of wall 400, star socket 100 is moved such that adhesive layer 52 of screw positioning foam 50 will adhere to planar face 401, as illustrated in FIG. 18C. Lastly, star socket 100 is pulled away from planar face 401 of wall 400, which will pull screw positioning foam 50 from within aperture 110 of star socket 100. A user then may use marking aperture 53 to make a marking on planar face 401 of wall 400 to designate where a mounting screw with mounting aperture of stud plate should be threaded into wall 400. A user then may remove screw positioning foam 50 from planar face 401 of wall 400 to reveal the mark made via the guide provided by marking aperture 53.

The following description should be taken in view of all the drawings and their respective descriptions, supra. It should be appreciated that star sockets 600 and 650 have a funneling configuration of their respective contoured sections, 621 and 655 of each tab of plurality of tabs 620 and 653, respectively—which both function in the manner described in view of FIG. 12 for star socket 100. It should also be appreciated that star sockets 800 and 900 have a funneling configuration of their respective contoured sections, 821 and 921 of contoured faces 801 and 901, respectively—which both function in the manner described in view of FIG. 12 for star socket 100, without the configuration of a plurality of tabs.

It should be noted that when stud 210 (or its alternative embodiments) is positioned within aperture 110 (or its alternative embodiments), that stud 210 may rotate within aperture 110 to position whiteboard 500 that is affixed to stud plate 200 to a particular angle. It should also be noted that stud 210 may be tilted slightly within aperture 110 to accommodate stud plates that may not be perfectly aligned with their respective star sockets on a whiteboard, or to accommodate irregularities on the selected wall. When stud 210 is engaged within aperture 110, there is an approximate five degrees of bend tolerance of star socket 100 before imparting sufficient force to remove stud 210 from aperture 110.

Substrate 10 of whiteboard 500 may be made of porcelain—or enamel coated plastic, aluminum or hard coated durable films laminated onto the rigid surface of substrate. Substrate 10 may be made of laminated chipboard, high-pressure laminates or steel boards with a matte-finished or glossy white, polyester or acrylic, coating. In a preferred embodiment, substrate 10 of whiteboard 500 is made of a material that allows for a semi-flexibility while maintaining a rigid form for removal from a mounted position. Substrate 10 in a preferred embodiment has an approximate thickness of 0.08", where substrate 10 is still rigid enough to maintain shape when supported at select mounting assembly points. Substrate 10, in a preferred embodiment, is of a construction that is flexible enough to bend. The bending allows reduced overall weight of substrate 10, deflection instead of snapping when force is exerted on substrate 10, flexion when substrate 10 is pulled away from an engaged mounting assembly, i.e., when star socket 100 is disengaged from stud plate 10, and conformity to irregularities on wall 400 or misaligned mounting assemblies when two or more mounting assemblies are used.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

10 Substrate
11 Design face of substrate 10
12 Mounting face of substrate 10
20 Outer border of substrate 10
21a, 21b . . . Lines of demarcation of design face 11 of substrate 10
22a, 22b . . . Shapes created by lines of demarcation 21a, 21b . . . and/or outer border 20
30 Marking
50 Screw positioning foam
51 Adhesive release liner
52 Adhesive layer of screw positioning foam 50
53 Marking aperture of screw positioning foam 50
100 Star plate
101 Contoured external face
102 Internal face
103 Base
110 Star aperture
120 Plurality of tabs of star aperture 110
120a Tab of plurality of tabs 120
121 Contoured section of each tab of plurality of tabs 120
121a Contoured section of tab 120a
122 Rounded end of each tab of plurality of tabs 120
122a Rounded end of tab 120a
150 Self-centering section of plurality of tabs 120
200 Stud plate
201 External face of stud plate 200
202 Mounting face of stud plate 200
210 Stud of external face 201
211 Body of stud 210
212 Annular ring of body 211
212a Lip edge of annular ring 212
212b Curved edge of annular ring 212
220 Mounting aperture of stud plate 200
230 Mounting channel of mounting face 202
230a First edge of mounting channel 230
230b Second edge of mounting channel 230
230c Third edge of mounting channel 230
300 Mounting assembly
310 Mounting screw
400 Wall
401 Planar surface
500 Whiteboard
500a First design of whiteboard 500
500b Second design of whiteboard 500
500c Third design of whiteboard 500
500d Fourth design of whiteboard 500
500e Fifth design of whiteboard 500
500f Sixth design of whiteboard 500
600 Alternative embodiment of star socket 100
601 Contoured face of star socket 600
610 Star aperture of star socket 600
620 Plurality of tabs of star socket 600
621 Contoured section of each tab of plurality of tabs 620
622 End of each tab of plurality of tabs 620
650 Alternative embodiment of star socket 100
651 Contoured face of star socket 650
652 Star aperture of star socket 650
653 Plurality of tabs of star socket 650
654 End of each tab of plurality of tabs 653
655 Contoured section of each tab of plurality of tabs 653
700 Alternative embodiment of stud plate 200
701 External face of stud plate 700
710 Dynamic stud 710
711 Plurality of dynamic protrusions of dynamic stud 710
711a Plurality of channels of dynamic stud 710
712 Body of each of plurality of dynamic protrusions 711
713 Lip of body 712
714 Rounded end of body 712
715 Internal surface of each of plurality of dynamic protrusions 711
720 Aperture of stud plate 700
721 Outer perimeter of aperture 720
800 Alternative embodiment of star socket 100
801 Contoured face of star socket 800
810 Aperture of star socket 800
811 Outer edge of aperture 810
812 Internal surface of aperture 810
821 Contoured section of contoured face 801
900 Alternative embodiment of star socket 100
901 Contoured face of star socket 900
902 Internal face of star socket 900
903 Base of star socket 900
903a Aperture body base
904 Aperture body
920 Aperture
923 Outer perimeter of aperture 920
923a Inner surface of aperture 920
924 First tension wire
925 Second tension wire
926 Wire channel
CP Center point of base 103
CP2 Center point of stud 210
F1 Funneling configuration of 121
F2 Funneling configuration of 121

What is claimed is:

1. A whiteboard having a mounting assembly, comprising:
a semi-flexible substrate having a design face and a mounting face, said design face including printed indicia having high contrast outlines; and,
a mounting assembly, comprising:
a star socket having a contoured face extending from a base, said contoured face having a centrally arranged aperture circumscribed by a plurality of tabs, each of said plurality of tabs having an end arranged proximate to a center point of said base, said each of said end of said plurality of tabs contoured in a direction towards said base, said base fixedly secured to said mounting face of said semi-flexible substrate;
a stud plate having a stud extending from a base, said stud having an annular ring arranged thereon, said base having a centrally arranged through-bore, said base of said stud plate arranged to be removably secured to an external structure,
wherein said stud of said stud plate is arranged to be frictionally secured within said aperture such that said annular ring of said stud creates interference with said each of said end of said plurality of tabs of said star socket.

2. The whiteboard having a mounting assembly recited in claim 1, wherein said each end of said plurality of tabs said star socket forms a self-centering slope, said self-centering slope is arranged to direct said stud of said stud plate within said centrally arranged aperture of said star socket.

3. The whiteboard having a mounting assembly recited in claim 1, wherein said annular ring of said stud of said stud plate further comprises two edges, a curved edge and a lip edge.

4. The whiteboard having a mounting assembly recited in claim 3, wherein said lip edge of said annular ring creates greater interference with said each of said end of said plurality of tabs of said star socket than interference created by said curved edge with said each of said end of said plurality of tabs of said star socket.

5. The whiteboard having a mounting assembly recited in claim 1, wherein said through-bore of said stud plate is arranged to accept a screw therein, said screw arranged to fix said stud plate to a wall.

6. The whiteboard having a mounting assembly recited in claim 1, wherein said base of said star socket is fixedly secured to said mounting face of said semi-flexible substrate via:
spin weld;
laser weld; or,
chemical bond.

7. The whiteboard having a mounting assembly recited in claim 1, wherein said stud of said stud plate may rotate within said centrally arranged aperture of said star socket.

8. A mounting assembly, comprising:
a star socket having a contoured face extending from a base, said contoured face having a centrally arranged aperture circumscribed by a plurality of tabs, each of said plurality of tabs having an end arranged proximate to a center point of said base, each of said ends of said plurality of tabs contoured in a direction towards said base, said base operatively arranged to fixedly secure to an object;
a stud plate having a stud extending from a base, said stud having an annular ring arranged thereon, said base having a centrally arranged through-bore, said base of said stud plate arranged to be removably secured to an external structure,
wherein said stud of said stud plate is arranged to be frictionally secured within said aperture such that said annular ring of said stud creates interference with said each of the ends of said plurality of tabs of said star socket.

9. A mounting assembly recited in claim 8, wherein each of said ends of said plurality of tabs said star socket forms a self-centering slope, said self-centering slope is arranged to direct said stud of said stud plate within said centrally arranged aperture of said star socket.

10. A mounting assembly recited in claim 8, wherein said annular ring of said stud of said stud plate further comprises two edges, a curved edge and a lip edge.

11. A mounting assembly recited in claim 10, wherein said lip edge of said annular ring creates greater interference with each of said ends of said plurality of tabs of said star socket than the interference created by said curved edge with each of said ends of said plurality of tabs of said star socket.

12. A mounting assembly recited in claim 8, wherein said through-bore of said stud plate is arranged to accept a screw therein, said screw arranged to fix said stud plate to said external structure.

13. A mounting assembly recited in claim 8, wherein said base of said star socket is fixedly secured to said mounting face of said semi-flexible substrate via:
spin weld;
laser weld; or,
chemical bond.

14. A mounting assembly recited in claim 8, wherein said stud of said stud plate may rotate within said centrally arranged aperture of said star socket.

15. A whiteboard, comprising:
a semi-flexible substrate having an outwardly facing design surface of a first color and an opposing inwardly facing surface, said outwardly facing design surface having an outer border about an entire perimeter thereof, said outer border comprising printed indicia of a second color which contrasts with said first color, wherein said outer border defines a shape of an object, said outwardly facing design surface further comprising at least one inner border, wherein said at least one inner border intersects at least said outer border at two points, or intersects at least one inner border at one point and said outer border at one point, or intersects at least one other inner border at one point and a different inner border at a second point, wherein each of said at least one inner border comprises printed indicia of a third color which contrasts with said first color, wherein said inner and outer borders intersect one another in such a way as to create discrete portions of said design surface and function as to create lines of demarcation between adjacent portions to define a surface area of said portions to be filled with a specific color of removable printed indicia.

16. The whiteboard recited in claim 3, wherein said design face includes a laminate arranged thereon.

17. The whiteboard recited in claim 15, wherein said third color is the same as said second color.

18. A whiteboard having a mounting assembly, comprising:
a semi-flexible substrate having an outwardly facing design surface of a first color and an opposing inwardly facing surface, said outwardly facing design surface having an outer border about an entire perimeter thereof, said outer border comprising printed indicia of a second color which contrasts with said first color, wherein said outer border defines a shape of an object, said outwardly facing design surface further comprising at least one inner border, wherein said at least one inner border intersects at least said outer border at two points, or intersects at least one inner border at one point and said outer border at one point, or intersects at least one other inner border at one point and a different inner border at a second point, wherein each of said at least one inner border comprises printed indicia of a third color which contrasts with said first color, wherein said inner and outer borders intersect one another in such a way as to create discrete portions of said design surface and function as to create lines of demarcation between adjacent portions to define a surface area of said portions to be filled with a specific color of removable printed indicia; and,
a mounting assembly, comprising:

a star socket having a contoured face extending from a base, said contoured face having a centrally arranged aperture circumscribed by a plurality of tabs, each of said plurality of tabs having an end arranged proximate to a center point of said base, said each of said end of said plurality of tabs contoured in a direction towards said base, said base fixedly secured to said mounting face of said semi-flexible substrate;

a stud plate having a stud extending from a base, said stud having a annular ring arranged thereon, said base having a centrally arranged through-bore, said base of said stud plate arranged to be removably secured to an external structure, wherein said stud of said stud plate is arranged to be frictionally secured within said aperture such that said annular ring of said stud creates interference with said each of said end of said plurality of tabs of said star socket.

19. The whiteboard having a mounting assembly recited in claim 18, wherein said each end of said plurality of tabs of said star socket forms a self-centering slope, said self-centering slope is arranged to direct said stud of said stud plate within said centrally arranged aperture of said star socket, wherein a lip edge of said annular ring creates greater interference with said each of said end of said plurality of tabs of said star socket than the interference created by said curved edge with said each of said end of said plurality of tabs of said star socket.

20. The whiteboard having a mounting assembly recited in claim 19, said design face includes a laminate arranged thereon, wherein said third color is the same as said second color.

\* \* \* \* \*